(12) United States Patent
Aikawa

(10) Patent No.: US 12,339,221 B2
(45) Date of Patent: Jun. 24, 2025

(54) COMPONENT MEASUREMENT DEVICE, COMPONENT MEASUREMENT DEVICE SET, AND INFORMATION PROCESSING METHOD

(71) Applicant: TERUMO KABUSHIKI KAISHA, Tokyo (JP)

(72) Inventor: Ryokei Aikawa, Hiratsuka (JP)

(73) Assignee: TERUMO KABUSHIKI KAISHA, Tokyo (JP)

( * ) Notice: Subject to any disclaimer, the term of this patent is extended or adjusted under 35 U.S.C. 154(b) by 230 days.

(21) Appl. No.: 18/339,598

(22) Filed: Jun. 22, 2023

(65) Prior Publication Data
US 2023/0349823 A1    Nov. 2, 2023

Related U.S. Application Data

(63) Continuation of application No. PCT/JP2022/001795, filed on Jan. 19, 2022.

(30) Foreign Application Priority Data

Feb. 18, 2021 (JP) ................................ 2021-024645

(51) Int. Cl.
*G01N 21/3563* (2014.01)

(52) U.S. Cl.
CPC ................................ *G01N 21/3563* (2013.01)

(58) Field of Classification Search
CPC ..... G01N 21/3563; G01N 2201/12707; G01N 21/13; G01N 21/314; G01N 21/8483;
(Continued)

(56) References Cited

U.S. PATENT DOCUMENTS

2005/0227274 A1* 10/2005 Takahashi ............ G01N 21/645
  435/6.12
2014/0204389 A1*  7/2014 Mukoh ............... G01B 9/02007
  356/479
(Continued)

FOREIGN PATENT DOCUMENTS

JP    2005-300292 A    10/2005
JP    2013-024797 A     2/2013
(Continued)

OTHER PUBLICATIONS

International Search Report issued in the corresponding International Patent Application No. PCT/JP2022/001795, dated Mar. 8, 2022.
(Continued)

*Primary Examiner* — David P Porta
*Assistant Examiner* — Gisselle M Gutierrez
(74) *Attorney, Agent, or Firm* — Foley & Lardner LLP

(57) ABSTRACT

A component measurement device includes: a chip insertion space into which a component measurement chip is insertable; a light emitting unit configured to emit irradiation light to the component measurement chip in a state in which the component measurement chip is located in the chip insertion space; a light receiving unit configured to receive light that has passed through or has been reflected by the component measurement chip; and a control unit configured to detect abnormality of the component measurement chip on a basis of a ratio of (i) a received light intensity in the light receiving unit when irradiation light having a first wavelength is emitted from the light emitting unit to (ii) a received light intensity in the light receiving unit when irradiation light having a second wavelength is emitted from the light emitting unit.

6 Claims, 14 Drawing Sheets

(58) Field of Classification Search
CPC ......... G01N 2021/3148; G01N 21/274; G01N 21/78; G01N 2201/1242; G01N 2201/1248; G01N 2201/12723
See application file for complete search history.

(56) References Cited

U.S. PATENT DOCUMENTS

| | | | |
|---|---|---|---|
| 2019/0011371 A1* | 1/2019 | Aikawa | G01N 33/726 |
| 2020/0011806 A1* | 1/2020 | Aikawa | A61B 5/14532 |
| 2020/0340888 A1* | 10/2020 | Moriuchi | A61B 5/15 |
| 2021/0263432 A1* | 8/2021 | Iwai | G03F 9/7023 |
| 2021/0318250 A1* | 10/2021 | Moriuchi | G01N 21/8483 |
| 2022/0371016 A1* | 11/2022 | Aikawa | G01N 33/721 |
| 2022/0390380 A1* | 12/2022 | Aikawa | G01N 21/8483 |

FOREIGN PATENT DOCUMENTS

| | | |
|---|---|---|
| JP | 2014-142281 A | 8/2014 |
| JP | 2014-533106 A | 12/2014 |
| JP | 2018-519676 A | 7/2018 |
| JP | 2020-067380 A | 4/2020 |

OTHER PUBLICATIONS

Written Opinion of the International Searching Authority issued in the corresponding International Patent Application No. PCT/JP2022/001795, dated Mar. 8, 2022.

International Searching Authority, "Written Opinion," issued in connection with International Patent Application No. PCT/JP2021/001795, dated Mar. 8, 2022 (with English translation).

* cited by examiner

FIG. 7
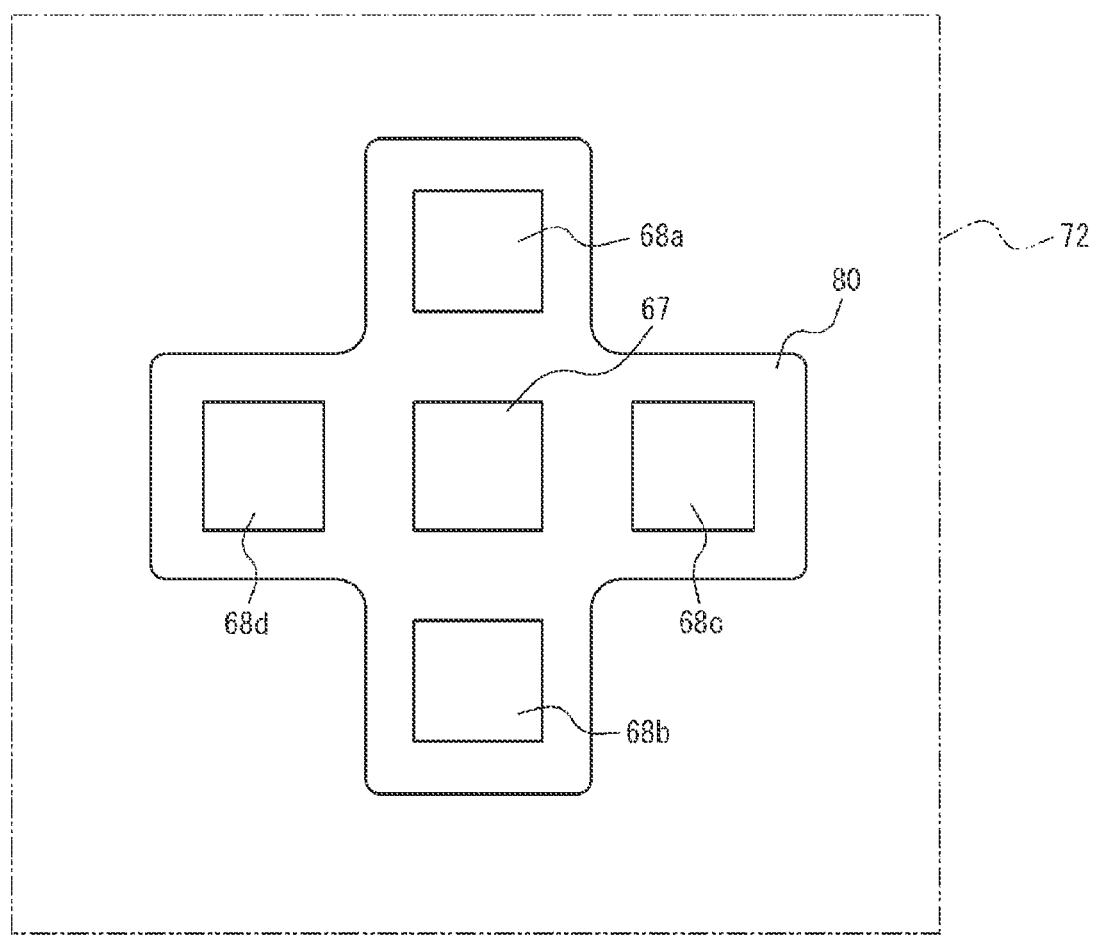
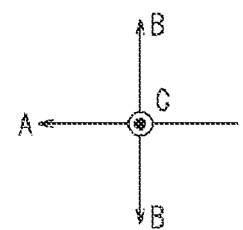

COMPONENT MEASUREMENT DEVICE, COMPONENT MEASUREMENT DEVICE SET, AND INFORMATION PROCESSING METHOD

CROSS-REFERENCE TO RELATED APPLICATIONS

This is a bypass continuation of PCT Application No. PCT/JP2022/001795, filed on Jan. 19, 2022, which claims priority to Japanese Application No. JP2021-024645, filed on Feb. 18, 2021. The contents of these applications are incorporated herein by reference in their entireties.

BACKGROUND

The present disclosure relates to a component measurement device, a component measurement device set, and an information processing method.

Conventionally, in a biochemical field and a medical field, a device for measuring a measurement target component contained in a sample such as blood as a specimen is known. The measurement target component is measured, for example, by attaching a component measurement chip (measurement reagent) that supplies a sample to the device, and irradiating the component measurement chip with light in the device.

The component measurement chip used in the measurement of the measurement target component may be, for example, deteriorated by being stored improperly, such as being exposed to a high temperature for a long time, or may be unintentionally deteriorated. When the deteriorated component measurement chip is used for measurement of the measurement target component, the measurement target component cannot be accurately measured due to a change in optical characteristics of the component measurement chip.

For such a problem of deterioration, a method for detecting deterioration is known. For example, Japanese Patent Publication No. 2013-024797 A ("Patent Literature 1") describes a method for forming a reference pad on a test piece in advance and determining a deterioration state of the test piece on the basis of an optical characteristic value of the reference pad. In addition, for example, Japanese Patent Publication No. 2014-533106 A ("Patent Literature 2") describes a method for determining deterioration of a test element by measuring intrinsic light emission of a test chemical substance disposed in the test element.

SUMMARY

According to the methods disclosed in Patent Literatures 1 and 2, in order to detect abnormality such as deterioration, for example, it is necessary to dispose a special member for the purpose of detecting abnormality of a reference pad, a test chemical substance, or the like in a component measurement chip in advance. As described above, it is complicated to dispose a special member for detecting abnormality of the component measurement chip.

An object of the present disclosure is to provide a component measurement device, a component measurement device set, and an information processing method, capable of detecting abnormality of a component measurement chip without separately disposing a special member.

A component measurement device according to a first aspect of the present disclosure includes: a chip insertion space into which a component measurement chip is inserted; a light emitting unit that emits irradiation light to the component measurement chip in a state in which the component measurement chip is inserted into the chip insertion space; a light receiving unit that receives light that has passed through or has been reflected by the component measurement chip; and a control unit, in which the control unit detects abnormality of the component measurement chip on the basis of a ratio, to a received light intensity in the light receiving unit when irradiation light having a specific wavelength is emitted from the light emitting unit, of a received light intensity in the light receiving unit when irradiation light having another wavelength is emitted from the light emitting unit.

According to an embodiment of the present disclosure, the control unit determines that abnormality has occurred in the component measurement chip in a case in which the ratio is out of a predetermined range.

According to an embodiment of the present disclosure, the irradiation light having another wavelength includes irradiation light having a plurality of wavelengths, the predetermined range is individually set for each of the plurality of wavelengths, and the control unit determines that abnormality has occurred in the component measurement chip in a case in which the ratio is out of the predetermined range for at least one of the plurality of wavelengths.

According to an embodiment of the present disclosure, the specific wavelength is a wavelength included in an infrared region.

A component measurement device set according to a second aspect of the present disclosure includes: a component measurement chip; and a component measurement device having a chip insertion space into which the component measurement chip is inserted, in which the component measurement device includes: a light emitting unit that emits irradiation light to the component measurement chip in a state in which the component measurement chip is inserted into the chip insertion space; a light receiving unit that receives light that has passed through or has been reflected by the component measurement chip; and a control unit, and the control unit detects abnormality of the component measurement chip on the basis of a ratio, to a received light intensity in the light receiving unit when irradiation light having a specific wavelength is emitted from the light emitting unit, of a received light intensity in the light receiving unit when irradiation light having another wavelength is emitted from the light emitting unit.

An information processing method according to a third aspect of the present disclosure is an information processing method executed by a component measurement device including: a light emitting unit that has a chip insertion space into which a component measurement chip is inserted and emits irradiation light to the component measurement chip in a state in which the component measurement chip is inserted into the chip insertion space; a light receiving unit that receives light that has passed through or has been reflected by the component measurement chip; and a control unit, the information processing method including: a step of calculating a ratio, to a received light intensity in the light receiving unit when irradiation light having a specific wavelength is emitted from the light emitting unit, of a received light intensity in the light receiving unit when irradiation light having another wavelength is emitted from the light emitting unit; and a step of detecting abnormality of the component measurement chip on the basis of the calculated ratio.

According to certain embodiments of the component measurement device, the component measurement device set, and the information processing method of the present disclosure, abnormality of the component measurement chip can be detected without separately disposing a special member.

BRIEF DESCRIPTION OF THE DRAWINGS

FIG. 7 is a diagram illustrating a positional relationship among a plurality of light sources in the component measurement device illustrated in FIG. 1.

DETAILED DESCRIPTION

Figure 1:
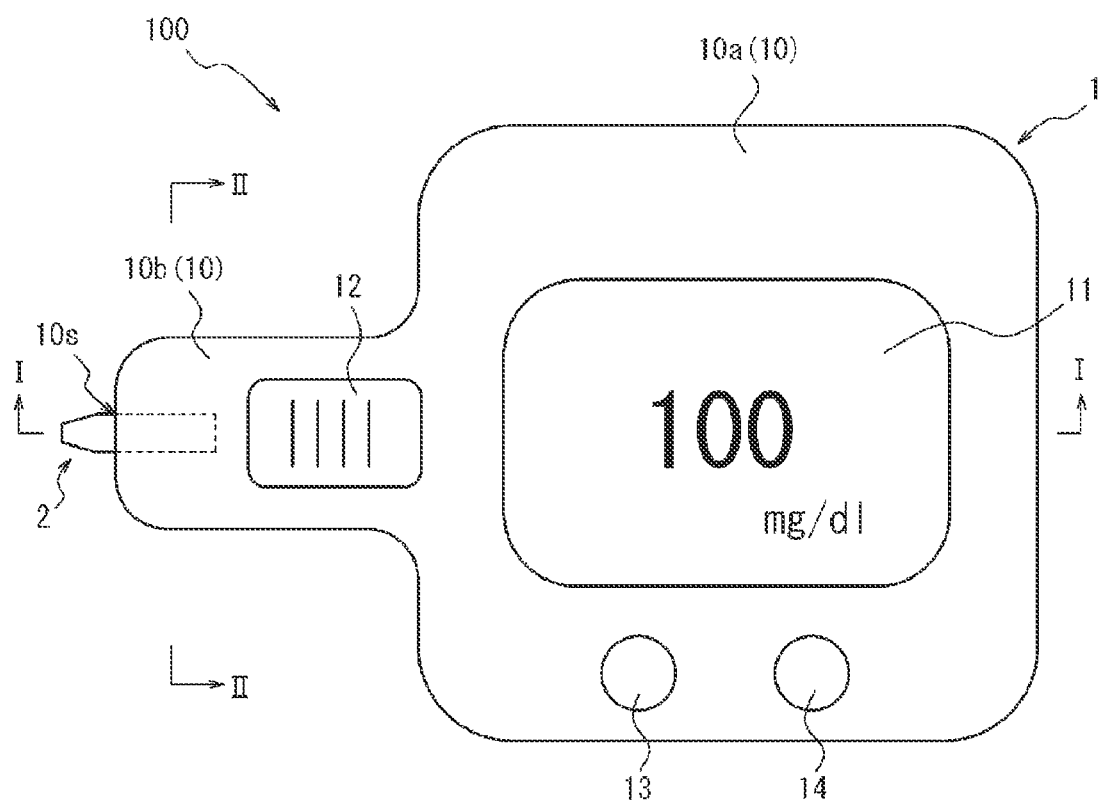
FIG. 1 is a top view of a component measurement device set in which a component measurement chip is attached to a component measurement device according to an embodiment.

Hereinafter, embodiments of a component measurement device, a component measurement device set, and an information processing method according to the present disclosure will be described with reference to FIGS. 1 to 16. In the drawings, the same members are denoted by the same reference numerals.

First, an embodiment of the component measurement device according to the present disclosure will be described.

Figure 2:
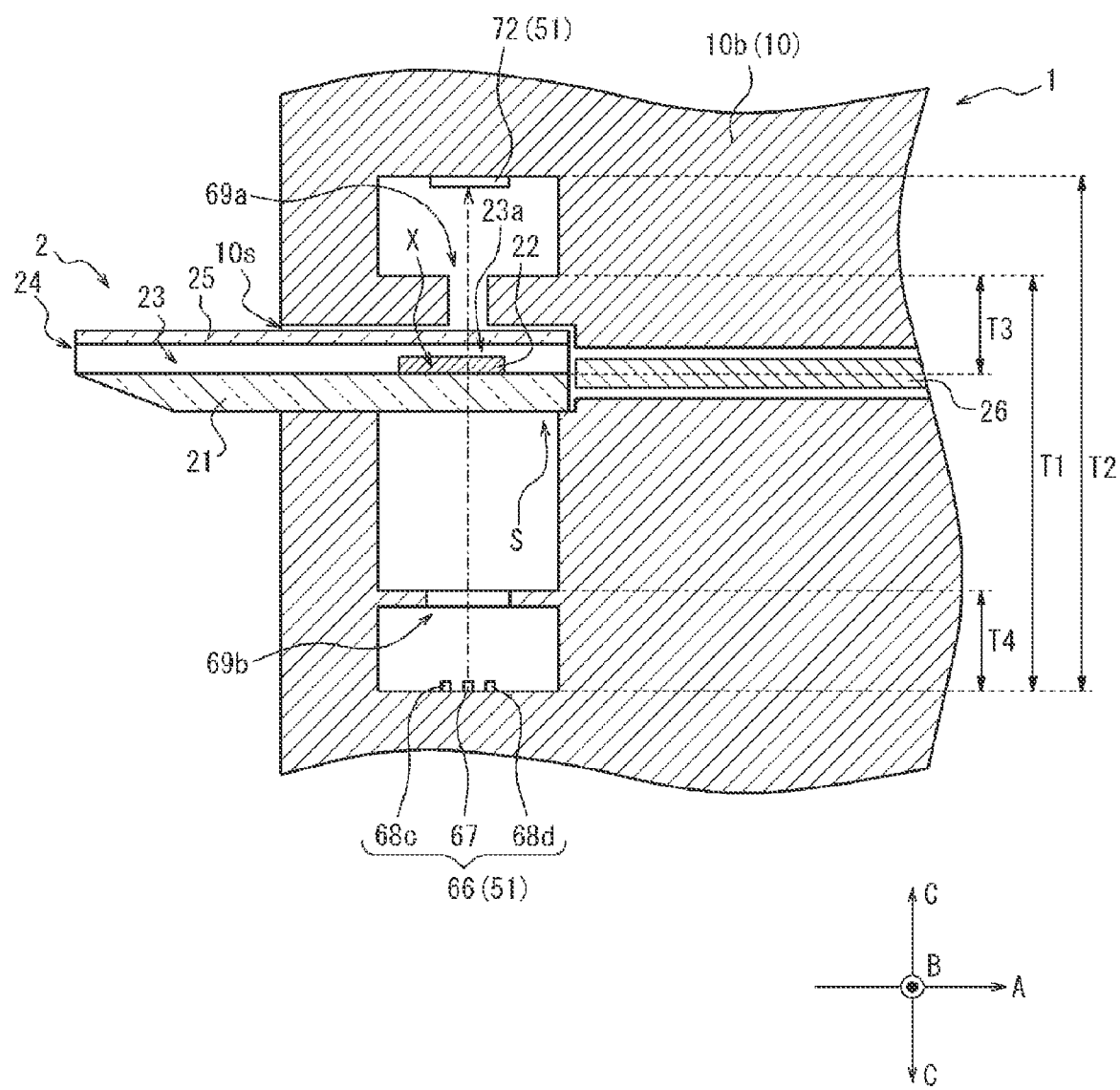
FIG. 2 is a diagram illustrating a cross section taken along line I-I in FIG. 1.
Figure 3:
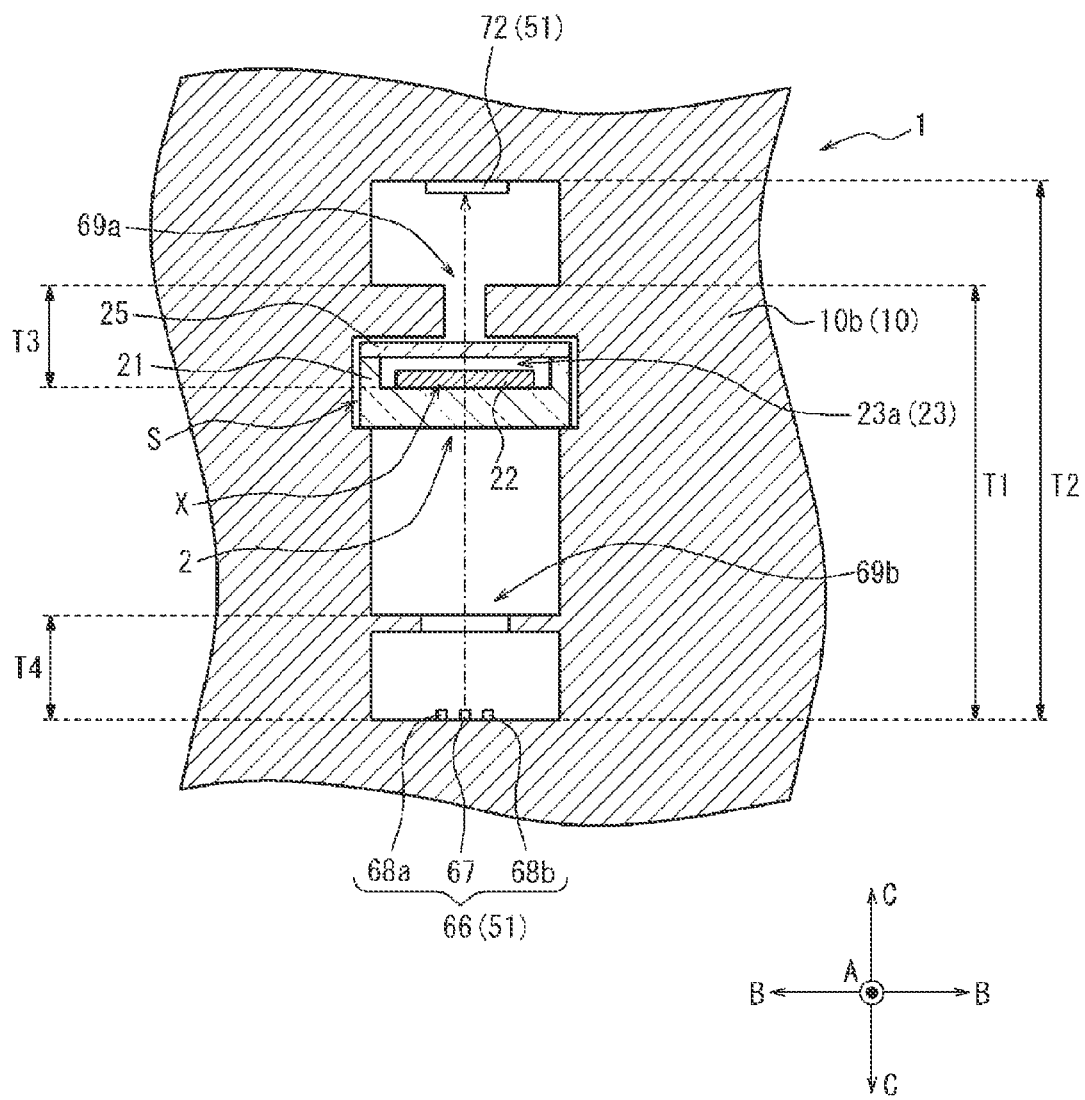
FIG. 3 is a diagram illustrating a cross section taken along line II-II in FIG. 1.

FIG. 1 is a top view illustrating a component measurement device set 100 in which a component measurement chip 2 is attached to a component measurement device 1 in the present embodiment. FIG. 2 is a cross-sectional view taken along line I-I in FIG. 1, and FIG. 3 is a cross-sectional view taken along line II-II in FIG. 1. FIGS. 2 and 3 are enlarged views of the vicinity of a portion to which the component measurement chip 2 is attached.

As illustrated in FIGS. 1 to 3, the component measurement device set 100 includes the component measurement device 1 and the component measurement chip 2. The component measurement device 1 of the present embodiment is a blood glucose level measurement device capable of measuring a concentration of glucose in a plasma component as a measurement target component in a sample. The component measurement chip 2 of the present embodiment is a blood glucose level measurement chip that can be attached to one end of the blood glucose level measurement device as the component measurement device 1. The "sample" referred to herein may be whole blood (blood) or separated plasma. The sample may be an aqueous solution containing glucose.

The component measurement device 1 includes a housing 10, a button group, a display unit 11, and a detachment lever 12. The housing 10 is formed of a resin material. The button group is disposed on an upper surface of the housing 10. The display unit 11 is constituted by a liquid crystal, a light emitting diode (LED), or the like disposed on the upper surface of the housing 10. The detachment lever 12 is operated when the component measurement chip 2 attached to the component measurement device 1 is detached. The button group of the present embodiment is constituted by a power button 13 and an operation button 14.

As illustrated in FIG. 1, the housing 10 includes a main body portion 10a having an upper surface on which the button group and the display unit 11 described above are disposed and having a substantially rectangular outer shape in top view, and a chip attachment portion 10b protruding outward from the main body portion 10a and having an upper surface on which the detachment lever 12 is disposed. As illustrated in FIG. 2, a chip insertion space S having a distal end opening 10s formed on a distal end surface of the chip attachment portion 10b as one end is defined in the chip attachment portion 10b. When the component measurement chip 2 is attached to the component measurement device 1, the component measurement chip 2 is inserted into the chip insertion space S through the distal end opening 10s from the outside, and the component measurement chip 2 is pushed up to a predetermined position. As a result, the component measurement chip 2 is locked by the chip attachment portion 10b of the component measurement device 1, and the component measurement chip 2 can be attached to the component measurement device 1. The component measurement chip 2 can be locked by the component measurement device 1 by various configurations, for example, by forming a claw portion that can be engaged with a part of the component measurement chip 2 in the chip attachment portion 10b.

When the component measurement chip 2 attached to the component measurement device 1 is detached from the component measurement device 1, by operating the detachment lever 12 described above from the outside of the housing 10, the locked state of the component measurement chip 2 by the chip attachment portion 10b of the component measurement device 1 is released. At the same time, an ejection pin 26 (see FIG. 2) in the housing 10 is displaced in conjunction, and the component measurement chip 2 can be detached from the component measurement device 1.

As an example, the housing 10 of the present embodiment has a configuration including the main body portion 10a having a substantially rectangular shape in top view (see FIG. 1) and the chip attachment portion 10b protruding outward from the main body portion 10a, but the shape of the housing 10 is not limited thereto. That is, the housing 10 only needs to have a configuration including a chip attachment portion to which the component measurement chip 2 can be attached, and is not limited to the shape of the housing 10 of the present embodiment. Therefore, in addition to the shape of the housing 10 of the present embodiment, for example, various shapes that make it easy for an operator to grip the housing 10 with one hand can also be adopted.

The display unit 11 can display information on the measurement target component measured by the component measurement device 1. In the present embodiment, a glucose concentration measured by the blood glucose level measurement device as the component measurement device 1 can be displayed on the display unit 11. On the display unit 11, not only information on the measurement target component but also various types of information such as measurement conditions of the component measurement device 1 and instruction information instructing an operator to perform a predetermined operation may be displayed. The operator can operate the power button 13 and the operation button 14 of the button group while checking contents displayed on the display unit 11.

As illustrated in FIGS. 2 and 3, the component measurement device 1 includes a light emitting unit 66 and a light receiving unit 72. As illustrated in FIGS. 2 and 3, in a state in which the component measurement chip 2 is attached to the chip insertion space S of the component measurement device 1, the component measurement chip 2 is irradiated with irradiation light emitted by the light emitting unit 66. The light receiving unit 72 receives transmission light that has passed through the component measurement chip 2 among irradiation light beams emitted from the light emitting unit 66 to the component measurement chip 2. In the present embodiment, the light emitting unit 66 and the light receiving unit 72 are disposed so as to face each other with the chip insertion space S interposed therebetween. Note that the disposition of the light emitting unit 66 and the light receiving unit 72 is not limited thereto. The light receiving unit 72 only needs to be at a position where light that passes through a sample in the component measurement chip 2 can be detected. For example, the light emitting unit 66 and the light receiving unit 72 may be disposed on the same side with respect to the component measurement chip 2, and a reflecting member may be disposed on a side facing the light emitting unit and the light receiving unit with the chip insertion space S and a sample interposed therebetween.

The light emitting unit 66 includes five light sources. Specifically, the light emitting unit 66 includes a first light source 67, a second light source 68a, a third light source 68b, a fourth light source 68c, and a fifth light source 68d. Here, as illustrated in FIG. 2, the first light source 67, the fourth light source 68c, and the fifth light source 68d are disposed at different positions in a flow direction A (a direction toward the right in FIG. 2) in which a sample flows in a flow path 23 of the component measurement chip 2 described later. As illustrated in FIG. 3, the first light source 67, the second light source 68a, and the third light source 68b are disposed at different positions in a flow path width direction B (both left and right directions in FIG. 3) orthogonal to the flow direction A. Details of disposition of the first light source 67 to the fifth light source 68d will be described later (see FIG. 7).

Figure 4:
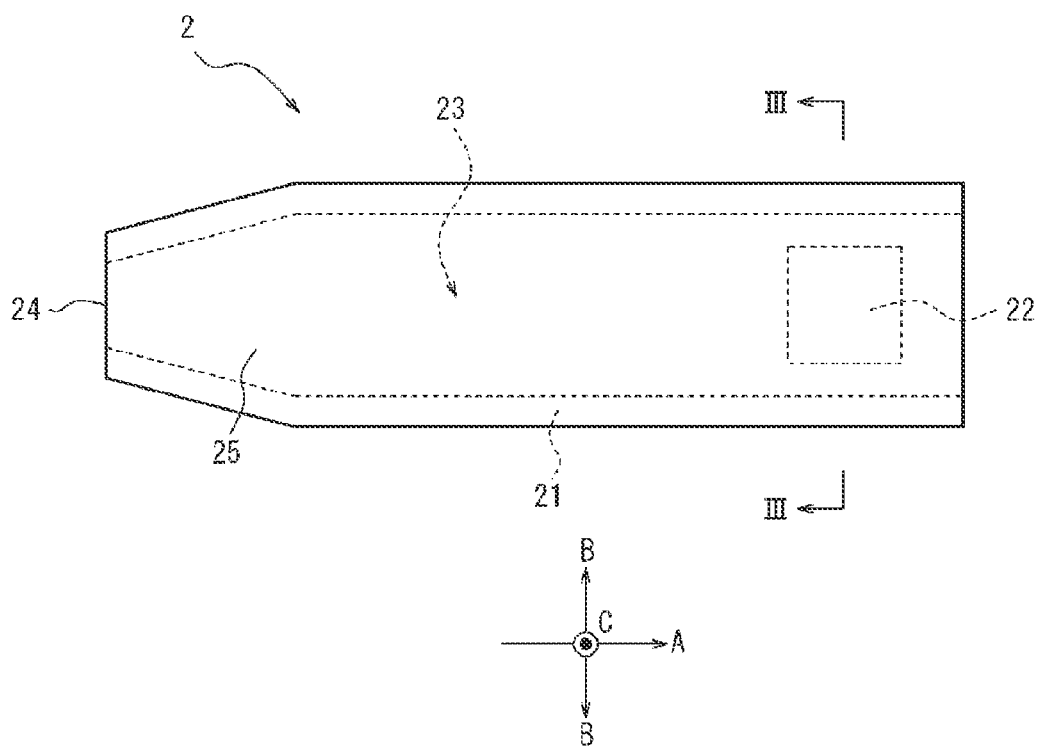
FIG. 4 is a top view illustrating the component measurement chip illustrated in FIG. 1.
Figure 5:
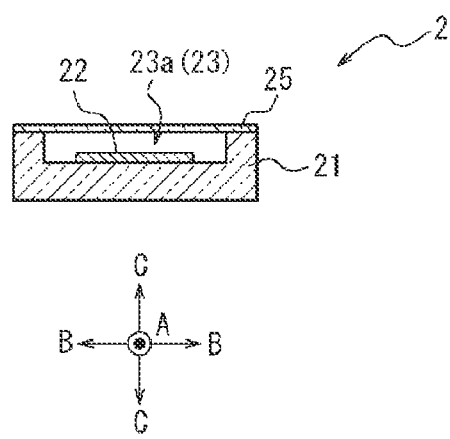
FIG. 5 is a cross-sectional view taken along line III-III in FIG. 4.

Next, the component measurement chip 2 will be described. FIG. 4 is a top view illustrating the component measurement chip 2. FIG. 5 is a cross-sectional view taken along line III-III in FIG. 4. As illustrated in FIGS. 4 and 5, the component measurement chip 2 includes a base member 21 having a substantially rectangular plate-like outer shape, a measurement reagent 22 held by the base member 21, and a cover member 25 covering the base member 21. In the cover member 25, a portion other than a portion where a measurement spot is formed in a state in which the component measurement chip 2 is inserted into the component measurement device 1 may be formed of a light-shielding member. Note that details of the measurement spot will be described later.

A groove is formed on a surface on one side in a thickness direction of the base member 21 (which is the same direction as a thickness direction C of the component measurement chip 2 illustrated in FIGS. 2 and 3 in the present embodiment, and therefore will be hereinafter referred to as the thickness direction C). The groove of the base member 21 is a hollow portion extending in a direction orthogonal to the thickness direction C by being covered with the cover member 25, and this hollow portion constitutes the flow path 23 of the component measurement chip 2. A supply portion 24 capable of supplying a sample from the outside is formed at one end of the flow path 23. The measurement reagent 22 is held in a groove bottom of the groove of the base member 21 on an inner wall of the flow path 23. A sample supplied from the outside to the supply portion 24 moves in the flow direction A along the flow path 23 using, for example, a capillary phenomenon, reaches a holding position where the measurement reagent 22 is held, and comes into contact with the measurement reagent 22. The measurement reagent 22 contains a color-developing reagent that is dissolved in the sample and reacts with a measurement target component in the sample to develop color. Therefore, when the measurement reagent 22 and the measurement target component in the sample come into contact with each other, a coloring reaction in which the color-developing reagent contained in the measurement reagent 22 develops color occurs to generate a coloring component (reaction product).

In addition, a gap 23a is formed between the cover member 25 and the measurement reagent 22. The sample moving in the flow direction A through the flow path 23 from the supply portion 24 formed at one end reaches the other end of the flow path 23 while dissolving the measurement reagent 22 and reacting with the measurement reagent 22. Therefore, by causing the sample to reach the entire region in the flow direction A of the measurement reagent 22, a mixture X containing the coloring component can be spread in a region that can be a measurement spot. Here, the mixture X contains at least the sample, the unreacted or reacted measurement reagent 22, and the coloring component.

In FIG. 2, for convenience of description, the sample is not illustrated, and it is illustrated that the "mixture X" is present at the holding position of the measurement reagent 22. However, the mixture X diffuses not only to the holding position of the measurement reagent 22 but also to the vicinity of the holding position of the measurement reagent 22 such as the gap 23a. More specifically, the sample entering the flow path 23 from the supply portion 24 reaches a downstream end of the flow path 23 through the gap 23a while being in contact with the measurement reagent 22 at the holding position, and the flow path 23 is filled with the sample. The measurement reagent 22 is dissolved in the sample, and a coloring reaction with the sample thereby proceeds, and the mixture X is located at the holding position and in the vicinity thereof.

The flow path 23 of the present embodiment is formed by a hollow portion defined by the base member 21 and the cover member 25, but the flow path is not limited to this configuration. The flow path may be formed only by a groove formed on an outer surface on one side of the base member 21 in the thickness direction C.

As materials of the base member 21 and the cover member 25, a transparent material is preferably used in order to obtain a signal sufficient for measurement as the amount of transmission light after irradiation light passes through the base member 21 and the cover member 25. Examples of the materials include: a transparent organic resin material such as polyethylene terephthalate (PET), polymethyl methacrylate (PMMA), polystyrene (PS), cyclic polyolefin (COP), a cyclic olefin copolymer (COC), or polycarbonate (PC); and a transparent inorganic material such as glass or quartz.

The measurement reagent 22 contains a color-developing reagent that reacts with the measurement target component in the sample to cause a coloring reaction that causes coloring according to a concentration of the measurement target component in blood. The measurement reagent 22 of the present embodiment is applied to a groove bottom of the groove as the flow path 23. The measurement reagent 22 of the present embodiment reacts with glucose as the measurement target component in the sample. Examples of the measurement reagent 22 of the present embodiment include: a mixed reagent of (i) glucose oxidase (GOD), (ii) peroxidase (POD), (iii) 1-(4-sulfophenyl)-2,3-dimethyl-4-amino-5-pyrazolone, and (iv)N-ethyl-N-(2-hydroxy-3-sulfopropyl)-3,5-dimethylaniline sodium salt monohydrate (MAOS); and a mixed reagent of glucose dehydrogenase (GDH) and a tetrazolium salt. The measurement reagent 22 may further contain a buffer such as a phosphate buffer or a mediator. The type and components of the measurement reagent 22 are not limited thereto.

The measurement reagent 22 of the present embodiment contains at least glucose dehydrogenase (GDH) and a tetrazolium salt. The content of glucose dehydrogenase contained in the measurement reagent 22 is not particularly limited, and can be appropriately selected according to the amount of the tetrazolium salt. The tetrazolium salt is not particularly limited, and can be appropriately selected according to a purpose. Examples of a material that can be selected as the tetrazolium salt include a tetrazolium salt (for example, 2-substituted benzothiazolyl-3-substituted phenyl-5-substituted sulfated phenyl-2H-tetrazolium, WST-4, WST-1, WST-5, MTS, or MTT), sodium phosphomolybdate, indigo carmine, dichloroindophenol, and resazurin. These materials may be used singly or in combination of two or more types thereof. Among these materials, as the tetrazolium salt, WST-4 or 2-substituted benzothiazolyl-3-substituted phenyl-5-substituted sulfated phenyl-2H-tetrazolium salt is preferable, and a tetrazolium salt having the following structure is particularly preferable.

[Chemical formula 1]

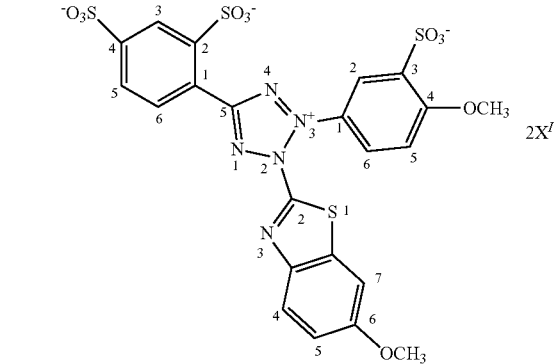

In the above chemical formula, X=Na.

In addition to glucose dehydrogenase, a tetrazolium salt, and the like, various components can be added to the measurement reagent 22 as necessary. For example, an electron transmitter, a buffer, a chelating agent, a surfactant, a viscosity modifier, a reaction accelerator, and the like may be appropriately added.

Note that, in the measurement reagent 22 of the present embodiment, a color-developing reagent in which a peak wavelength in an absorbance spectrum of a coloring component generated by a coloring reaction with glucose in the sample is different from a peak wavelength caused by light absorption characteristics of hemoglobin in a hemocyte is selected. In the color-developing reagent contained in the measurement reagent 22 of the present embodiment, an absorbance spectrum of a coloring component has a peak wavelength around 660 nm, but the color-developing reagent is not limited to a color-developing reagent in which the peak wavelength is around 660 nm, and is appropriately selected according to a purpose.

As illustrated in FIG. 2, when the component measurement device 1 measures the measurement target component, the component measurement chip 2 is attached into the chip attachment portion 10b. Then, when a sample is supplied to the supply portion 24 formed at one end of the component measurement chip 2, the sample moves in the flow path 23 due to, for example, a capillary phenomenon, and reaches a holding position where the measurement reagent 22 is held in the flow path 23. At this holding position, glucose in the sample (plasma) reacts with the measurement reagent 22. Then, at the holding position of the flow path 23, the mixture X containing the coloring component is generated. The component measurement device 1 of a so-called colorimetric type irradiates the mixture X containing the coloring component with irradiation light, detects the amount of transmission light (or the amount of reflected light) thereof, and obtains a detection signal correlated with the intensity of color development according to a concentration in blood. Then, the component measurement device 1 refers to a calibration curve created in advance, and can thereby measure the measurement target component. As described above, the component measurement device 1 of the present embodiment can measure a glucose concentration in a plasma component in the sample.

Figure 6:
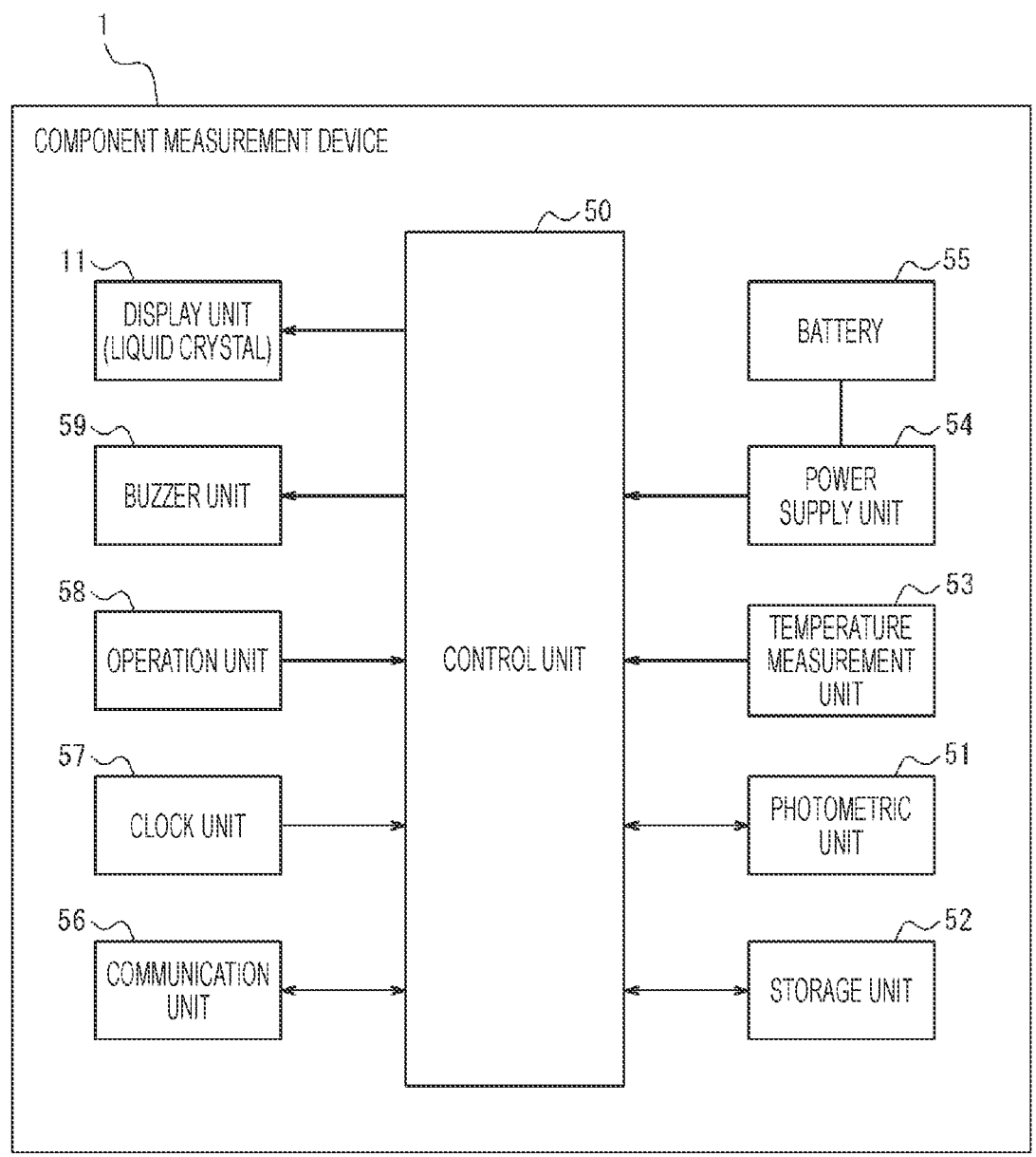
FIG. 6 is a functional block diagram of the component measurement device illustrated in FIG. 1.

FIG. 6 is a functional block diagram of the component measurement device 1 illustrated in FIGS. 1 to 3. As illustrated in FIG. 6, the component measurement device 1 includes a control unit 50, a photometric unit 51, a storage unit 52, a temperature measurement unit 53, a power supply unit 54, a battery 55, a communication unit 56, a clock unit 57, an operation unit 58, a buzzer unit 59, and a display unit 11.

The control unit 50 is constituted by a micro-processing unit (MPU) or a central processing unit (CPU), and can implement control operation of each unit by reading and executing a program stored in the storage unit 52 or the like. The storage unit 52 is constituted by a volatile or nonvolatile non-transitory storage medium, and can read or write various types of data (including a program) necessary for executing the component measurement method described in the present embodiment.

The control unit 50 can measure the measurement target component in the sample by operating the photometric unit 51. In addition, the control unit 50 determines abnormality of the component measurement chip 2 attached to the component measurement device 1 when the component measurement device 1 executes processing of measuring the measurement target component. Specifically, the control unit 50 determines whether or not the component measurement chip 2 attached to the component measurement device 1 has such abnormality that affects the processing of measuring the measurement target component by the component measurement device 1. Details of the processing of measuring the measurement target component and the processing of determining abnormality of the component measurement chip 2 will be described later.

The photometric unit 51 is an optical system capable of acquiring optical characteristics of the mixture X containing the sample and the coloring component. Specifically, the photometric unit 51 includes the light emitting unit 66 and the light receiving unit 72.

The light emitting unit 66 emits irradiation light toward the chip insertion space S. The light emitting unit 66 includes a plurality of light sources. Specifically, the light emitting unit 66 of the present embodiment includes five light sources that emit irradiation light (for example, visible light and infrared light) having different spectral radiation characteristics. More specifically, as described above, the light emitting unit 66 of the present embodiment includes the first light source 67, the second light source 68a, the third light source 68b, the fourth light source 68c, and the fifth light source 68d. A positional relationship among the first light source 67 to the fifth light source 68d is the positional relationship illustrated in FIGS. 2 and 3. The actual positional relationship among the first light source 67 to the fifth light source 68d will be described later in detail (see FIG. 7).

Peak wavelengths of light emitted from the first light source 67 to the fifth light source 68d are $\lambda 1$ to $\lambda 5$, respectively. As the first light source 67 to the fifth light source 68d, various light emitting elements such as an LED element, an organic electro-luminescent (EL) element, an inorganic EL element, and a laser diode (LD) element can be applied. As the first light source 67 to the fifth light source 68d, the above-described LED element is easily used in consideration of versatility and the like. In the present embodiment, the first light source 67 to the fifth light source 68d are constituted by LED elements. Hereinafter, the above-described "peak wavelength" will be described as a wavelength of light emitted from each light source. For convenience of description, the peak wavelength $\lambda 1$ of the first light source 67 is referred to as "first predetermined wavelength $\lambda 1$", the peak wavelength $\lambda 2$ of the second light source 68a is referred to as "second predetermined wavelength $\lambda 2$", the peak wavelength $\lambda 3$ of the third light source 68b is referred to as "third predetermined wavelength $\lambda 3$", the peak wavelength $\lambda 4$ of the fourth light source 68c is referred to as "fourth predetermined wavelength $\lambda 4$", and the peak wavelength $\lambda 5$ of the fifth light source 68d is referred to as "fifth predetermined wavelength $\lambda 5$". The "peak wavelength" in the present embodiment is indicated by one numerical value for convenience, but may also include a wavelength range of ±20 nm of each numerical value.

The light receiving unit 72 receives transmission light or reflected light of the irradiation light emitted from the light emitting unit 66 in a region where the coloring component is located. As illustrated in FIGS. 2 and 3, the light receiving unit 72 of the present embodiment is constituted by one light receiving element disposed so as to face the light emitting unit 66 with the component measurement chip 2 interposed therebetween. In the present embodiment, the light receiving unit 72 receives transmission light that has been emitted from the first light source 67 to the fifth light source 68d of the light emitting unit 66 to the mixture X generated at the holding position of the measurement reagent 22 of the component measurement chip 2 and has passed through the component measurement chip 2. As the light receiving unit 72, various photoelectric conversion elements including a photo diode (PD) element, a photoconductor, and a photo transistor (PT) can be used.

In the present specification, hereinafter, in the component measurement device 1, a region irradiated with irradiation light detectable by the light receiving unit 72 among regions irradiated with irradiation light from the light emitting unit 66 is referred to as a measurement region. When measurement is performed, the coloring component (or mixture X) to be detected is present in the measurement region.

Each of the first light source 67 to the fifth light source 68d receives a drive power signal from a light emission control circuit included in the photometric unit 51, and is turned on and off on the basis of the drive power signal. The light receiving unit 72 outputs an analog signal corresponding to received light. This analog signal is subjected to amplification and AD conversion by a light reception control circuit included in the photometric unit 51, and is converted into a digital signal (hereinafter, referred to as a detection signal).

When FIG. 6 is referred to again, the storage unit 52 can be constituted by a semiconductor memory, a magnetic memory, or the like. The storage unit 52 stores, for example, various types of information and a program for operating the component measurement device 1. The storage unit 52 may also function as a work memory.

The temperature measurement unit 53 measures a temperature in the vicinity of the component measurement chip 2. The temperature measurement unit 53 measures, for example, a temperature of the chip insertion space S. The temperature measurement unit 53 may be constituted by, for example, a known thermometer. A temperature measured by the temperature measurement unit 53 can be used, for example, in adjustment of the amount of irradiation light emitted from the light emitting unit 66 described later.

The power supply unit 54 supplies power stored in the battery 55 to each functional unit of the component measurement device 1.

The communication unit 56 transmits and receives various types of information by performing wired communication or wireless communication with an external device. For example, the communication unit 56 transmits a result of component measurement by the component measurement device 1 to an external device communicably connected. The communication unit 56 may receive a signal for executing an operation by the component measurement device 1 from an external device communicably connected.

The clock unit 57 measures time and clocks time. The clock unit 57 may be constituted by, for example, a real time clock (RTC).

The operation unit 58 is an input interface for an operator of the component measurement device 1 to perform an input operation on the component measurement device 1. In the present embodiment, the operation unit 58 is constituted by the power button 13 and the operation button 14. Note that the configuration of the operation unit 58 is not limited to the power button 13 and the operation button 14, and may be implemented in any mode in which an operator can perform an input operation.

The buzzer unit 59 outputs a buzzer sound to give notification of information. The buzzer unit 59 outputs a buzzer sound at a predetermined timing set in advance. The buzzer unit 59 outputs a buzzer sound, for example, when the component measuring processing by the component measurement device 1 is completed or when a failure occurs in the component measurement device 1.

Next, the processing of measuring the measurement target component in the sample by the control unit 50 of the component measurement device 1 and the disposition of the first light source 67 to the fifth light source 68d will be described.

The control unit 50 instructs the photometric unit 51 to perform a measurement operation, and measures a concentration of the measurement target component using a detection signal acquired by the photometric unit 51 and various types of data.

The storage unit 52 stores measured value data of a first measured value D1 to a fifth measured value D5, correction coefficient data, and calibration curve data. The first measured value D1 to the fifth measured value D5 are absorbances of the mixture X at the first predetermined wavelength $\lambda 1$ to the fifth predetermined wavelength $\lambda 5$ measured by the photometric unit 51, respectively. The correction coefficient data includes a group of correction coefficients correlated with absorbances of the mixture X at the second predetermined wavelength $\lambda 2$ to the fifth predetermined wavelength $\lambda 5$, respectively. The calibration curve data is a calibration curve indicating a relationship between an absorbance of a coloring component in the mixture X obtained by correcting an absorbance of the mixture X measured at the first predetermined wavelength $\lambda 1$ with the correction coefficient data and various physical quantities (for example, glucose concentration), a calibration curve indicating a relationship between an absorbance of hemoglobin in the mixture X and a hematocrit value, or the like. The "hematocrit value" is a value indicating a volume ratio of a hemocyte component in blood as a sample to blood (whole blood) in percentage.

The component measurement device 1 can measure the measurement target component in a sample on the basis of optical characteristics of the mixture X containing a coloring component generated by a coloring reaction between the measurement target component in the sample and the reagent. Specifically, the component measurement device 1 can estimate the amount of noise other than the coloring component included in the first measured value D1 of the absorbance of the mixture X measured by irradiating the mixture X with irradiation light having the first predetermined wavelength $\lambda 1$ as a measurement wavelength using irradiation light having the second predetermined wavelength $\lambda 2$ to the fifth predetermined wavelength $\lambda 5$. More specifically, the component measurement device 1 can estimate the above-described noise amount using the second measured value D2 to the fifth measured value D5 of the absorbance of the mixture X measured by irradiating the mixture X with the irradiation light having the second predetermined wavelength $\lambda 2$ to the fifth predetermined wavelength $\lambda 5$ to measure the absorbance of the coloring component and further the measurement target component.

FIG. 7 is a diagram illustrating a positional relationship among the first light source 67 to the fifth light source 68d when the component measurement device 1 is viewed from an upper surface (see FIG. 1) side of the component measurement device 1. In FIG. 7, for convenience of description, the position of the light receiving unit 72 in the flow path 23 of the component measurement chip 2 is indicated by a two-dot chain line, and in the present embodiment, the mixture X is generated at the holding position in the flow path 23 and in the vicinity thereof.

As illustrated in FIGS. 2, 3, and 7, the first light source 67 to the fifth light source 68d are disposed so as to face the mixture X located in the flow path 23 of the sample. More specifically, the first light source 67 to the fifth light source 68d of the present embodiment are disposed so as to face the holding position of the measurement reagent 22 in the flow path 23 of the sample in a direction orthogonal to both the flow direction A and the flow path width direction B (the same direction as the thickness direction C of the component measurement chip 2 in the present embodiment).

As illustrated in FIGS. 3 and 7, the first light source 67 and the second light source 68a are disposed side by side in the flow path width direction B orthogonal to the flow direction A of the sample at the position of the mixture X in the flow path 23 of the sample. In the present embodiment, the first light source 67 and the second light source 68a are disposed such that a first irradiation position SL1 of the irradiation light from the first light source 67 in the mixture X and a second irradiation position SL2 of the irradiation light from the second light source 68a in the mixture X overlap with each other in the flow path width direction B.

Figure 8:
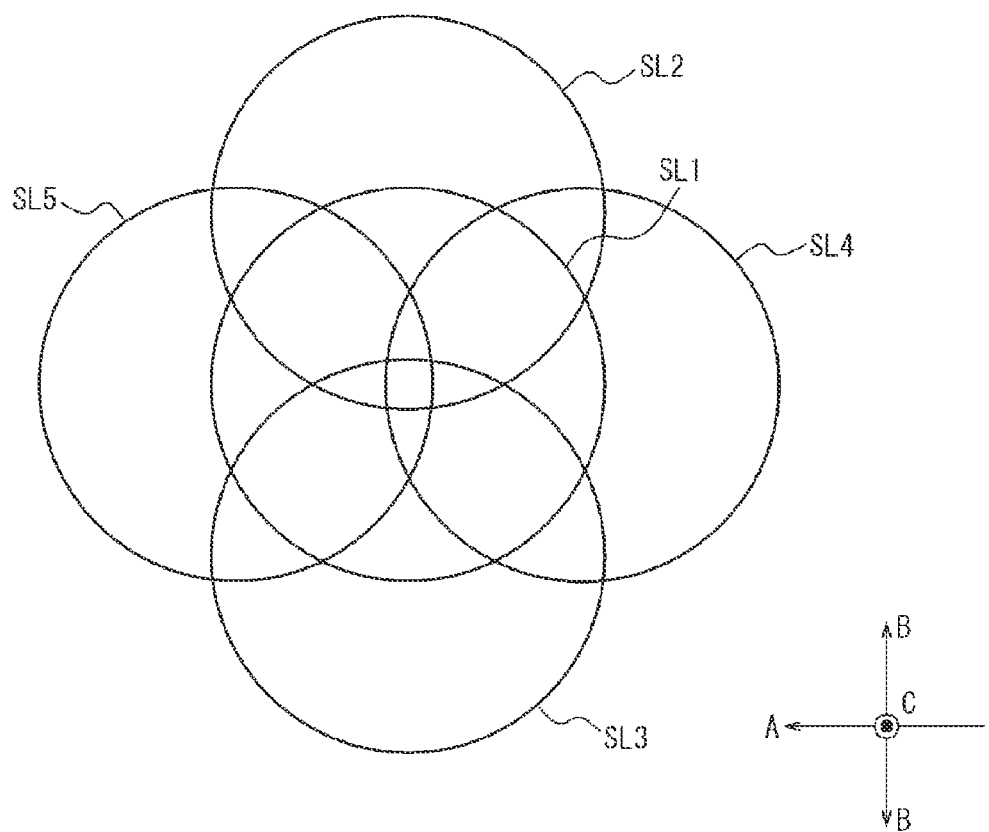
FIG. 8 is a diagram illustrating irradiation positions of irradiation light of the plurality of light sources illustrated in FIG. 7 on a mixture.

In addition, as illustrated in FIGS. 3 and 7, the first light source 67, the second light source 68a, and the third light source 68b are disposed side by side in the flow path width direction B with the first light source 67 as the center. In the present embodiment, as illustrated in FIG. 8, the first light source 67 and the third light source 68b are disposed such that a region of the first irradiation position SL1 of the irradiation light from the first light source 67 in the mixture X in the flow direction A and a region of a third irradiation position SL3 of the irradiation light from the third light source 68b in the mixture X in the flow direction A overlap with each other in the flow path width direction B.

That is, the first light source 67 to the third light source 68b are disposed such that the irradiation positions thereof overlap with each other in the flow path width direction B. Preferably, the first light source 67 to the third light source 68b are disposed side by side in the flow path width direction B, and the regions of the first irradiation position SL1 to the third irradiation position SL3 in the flow direction A overlap with each other in the flow path width direction B. In addition, in the first light source 67 to the third light source 68b, the regions of the first irradiation position SL1 to the third irradiation position SL3 in the flow path width direction B more preferably overlap with each other also in the flow direction A.

In the present embodiment, the first light source 67 and the second light source 68a are disposed adjacent to each other in the flow path width direction B, and there is no gap in which another light source can be disposed between the first light source 67 and the second light source 68a. In addition, the first light source 67 and the third light source 68b are disposed adjacent to each other in the flow path width direction B, and there is no gap in which another light source can be disposed between the first light source 67 and the third light source 68b. As described above, the first light source 67, the second light source 68a, and the third light source 68b are disposed adjacent to each other without another light source interposed therebetween in the flow path width direction B.

As illustrated in FIGS. 2 and 7, the first light source 67 and the fourth light source 68c are disposed side by side in the flow direction A. In addition, as illustrated in FIGS. 2 and 7, the first light source 67 and the fifth light source 68d of the present embodiment are disposed side by side in the flow direction A. That is, the first light source 67, the fourth light source 68c, and the fifth light source 68d are disposed side by side in the flow direction A with the first light source 67 at the center.

In the present embodiment, the first light source 67 and the fourth light source 68c are disposed side by side in the flow direction A such that the region of the first irradiation position SL1 of the irradiation light from the first light source 67 in the mixture X and a region of a fourth irradiation position SL4 of the irradiation light from the fourth light source 68c in the mixture X overlap with each other in state in which a difference in incident angle on the mixture X is equal to or less than a predetermined value. More specifically, there is no gap in which another light source can be disposed between the first light source 67 and the fourth light source 68c in the flow direction A, and the first light source 67 and the fourth light source 68c are adjacent to each other in the flow direction A.

Also the first light source 67 and the fifth light source 68d are disposed side by side in the flow direction A such that the region of the first irradiation position SL1 of the irradiation light from the first light source 67 in the mixture X and a region of a fifth irradiation position SL5 of the irradiation light from the fifth light source 68d in the mixture X can overlap with each other in state in which a difference in incident angle on the mixture X is equal to or less than a predetermined value. More specifically, there is no gap in which another light source can be disposed between the first light source 67 and the fifth light source 68d in the flow direction A, and the first light source 67 and the fifth light source 68d are adjacent to each other in the flow direction A.

As illustrated in FIG. 7, the first light source 67 to the fifth light source 68d of the present embodiment are held by a thin plate-shaped holder member 80. The holder member 80 of the present embodiment has a cross shaped outer shape in top view, and the first light source 67 is held at a central portion (cross portion) in top view. In addition, the second light source 68a is held at a position on one side in the flow path width direction B with respect to the central portion where the first light source 67 is held, and the third light source 68b is held at a position on the other side in the flow path width direction B. In addition, the fifth light source 68d is held at a position in the flow direction A with respect to the central portion where the first light source 67 is held, and the fourth light source 68c is held at a position opposite to the flow direction A.

Here, in the present embodiment, the second light source 68a and the third light source 68b that emit irradiation light having the second predetermined wavelength λ2 and the third predetermined wavelength λ3, respectively, are disposed side by side in the flow path width direction B with respect to the first light source 67. In addition, the fourth light source 68c and the fifth light source 68d that emit irradiation light having the fourth predetermined wavelength λ4 and the fifth predetermined wavelength λ5, respectively, are disposed side by side in the flow direction A with respect to the first light source 67. Although details will be described later, the above-described second predetermined wavelength λ2 and third predetermined wavelength 23 are wavelengths belonging to an infrared region, and the above-described fourth predetermined wavelength λ4 and fifth predetermined wavelength λ5 are wavelengths belonging to a visible region.

In the present embodiment, as illustrated in FIGS. 2 and 3, the light receiving unit 72 faces the first light source 67 to the fifth light source 68d in the thickness direction C with the mixture X located in the flow path 23 of the attached component measurement chip 2 interposed therebetween. The light receiving unit 72 receives transmission light that is obtained by irradiation light from the first light source 67 to the fifth light source 68d passing through the mixture X. As illustrated in FIGS. 2 and 3, the component measurement device 1 includes a first throttle portion 69a that is located between the mixture X and the light receiving unit 72 and adjusts the amount of light that reaches the light receiving unit 72 among transmission light beams that have passed through the mixture X. A difference between an incident angle of the irradiation light from the first light source 67 on the mixture X and an incident angle of the irradiation light from each of the second light source 68a to the fifth light source 68d on the mixture X affects estimation accuracy of a noise amount. Therefore, the smaller the difference between an incident angle of the irradiation light from the first light source 67 on the mixture X and an incident angle of the irradiation light from each of the second light source 68a to the fifth light source 68d on the mixture X, the better. That is, a longer distance T1 between the first light source 67 to the fifth light source 68d and the first throttle portion 69a in a facing direction (the same direction as the thickness direction C of the component measurement chip 2 in FIGS. 2 and 3) is more preferable in order to improve the estimation accuracy of the noise amount. Meanwhile, by reducing a distance T2 between the first light source 67 to the fifth light source 68d and the light receiving unit 72 in a facing direction, light efficiency can be improved, and the component measurement device 1 can be downsized.

In addition, when a deviation (hereinafter, referred to as "measurement visual field difference") between the region of the first irradiation position SL1 of the first light source 67 and the region of each of the second irradiation position SL2 to the fifth irradiation position SL5 of the second light source 68a to the fifth light source 68d is large, measurement points do not coincide with each other, and therefore accuracy of a measurement result of the measurement target component may decrease. Therefore, the measurement visual field difference is preferably small. Therefore, a distance T3 between the mixture X and the first throttle portion 69a in a facing direction (the same direction as the thickness direction C of the component measurement chip 2 in FIGS. 2 and 3) is preferably small. More preferably, in addition to the first throttle portion 69a, one surface of the component measurement chip 2 is formed of a light shielding member, and an opening through which measurement light can pass is formed, thereby forming a throttle (aperture). Note that, in this case, only a measurement spot may be formed of a transparent member to form a throttle, or a light shielding member may be cut out to form a throttle.

Furthermore, as illustrated in FIGS. 2 and 3, the component measurement device 1 includes a second throttle portion 69b that is located between the first light source 67 to the fifth light source 68d and the mixture X and adjusts the amount of light that reaches the mixture X from the first light source 67 to the fifth light source 68d. In particular, the second throttle portion 69b is preferably designed such that light (hereinafter, referred to as "stray light") reflected by an inner wall of the second throttle portion 69b among light beams emitted from the first light source 67 to the fifth light source 68d does not enter the first throttle portion 69a. It can be considered that light emitted from the first light source 67 to the fifth light source 68d is attenuated to 5% by one time wall surface reflection and disappears by multiple reflection in which reflection is performed three or more times. Therefore, in the present embodiment, if the stray light reflected by the inner wall of the second throttle portion 69b does not reach the first throttle portion 69a and is reflected by a certain wall surface, the stray light does not enter the first throttle portion 69a by multiple reflection. In the present embodiment, an optical axis of each of the light sources is designed to be specularly reflected by the inner wall of the second throttle portion 69b, but actually, diffused reflection occurs on the inner wall of the second throttle portion 69b, and stray light also has a predetermined distribution. Therefore, in the present embodiment, it is preferable to set the above-described distance T4 and the like such that, even when a part of the stray light enters the first throttle portion 69a, a difference between an incident angle thereof and an incident angle of the first light source 67 is equal to or less than a predetermined value.

To the component measurement device 1 of the present embodiment, the component measurement chip 2 which defines the flow path 23 through which a sample flows and in which the measurement reagent 22 containing a color-developing reagent that undergoes a coloring reaction with the measurement target component in the sample is disposed in the flow path 23 can be attached. To the component measurement device 1 of the present embodiment, the component measurement chip 2 is attached, and the component measurement device 1 can measure the measurement target component in the sample on the basis of optical characteristics of the mixture containing a coloring component generated by a reaction with the measurement target component in the flow path 23. The component measurement device 1 preferably has a configuration in which the disposable component measurement chip 2 is detachable.

Next, a method for calculating a concentration of a measurement target component in a sample by the control unit 50 of the component measurement device 1 according to the present embodiment will be described.

In the present embodiment, the component measurement device 1 measures a blood glucose level with a sample (for example, whole blood) and a color-developing reagent in the measurement reagent 22 without separating a plasma component containing glucose from the sample by using a coloring reaction between glucose as a measurement target component in the sample and the color-developing reagent. The component measurement device 1 can estimate an absorbance of a coloring component generated by the coloring reaction between glucose and the color-developing reagent at a predetermined measurement wavelength on the basis of an absorbance of a whole mixture X obtained by the coloring reaction at each wavelength, and calculate a concentration of the measurement target component.

In general, when a component other than a coloring component to be measured is contained in a sample, occurrence of an optical phenomenon may affect a measurement result of a concentration of a measurement target component based on an absorbance of the coloring component as a disturbance factor (noise). For example, "light scattering" due to a hemocyte component in the sample, a surface of the component measurement chip, fine particles such as dust attached to the component measurement chip, and the like, or "light absorption" due to a dye component (specifically, mainly hemoglobin when the sample is blood) different from the coloring component to be measured occurs, and as a result, there is a tendency that an absorbance larger than a true value is measured.

In a case in which an absorbance derived from the coloring component is accurately measured using a mixture X containing a sample having specific light absorption characteristics in addition to the coloring component to be measured, it is necessary to remove a disturbance factor (noise) due to light absorption characteristics derived from the sample from a measured value of an absorbance at a predetermined measurement wavelength.

Examples of the disturbance factor when the sample is blood include light scattering due to a hemocyte component and light absorption due to hemoglobin. More specifically, it is necessary to estimate the amount of disturbance factor (noise) such as light scattering due to a hemocyte component or the like or light absorption due to hemoglobin at a predetermined measurement wavelength (for example, 660 nm) at which a light absorptivity of the coloring component to be measured is high, and to correct a measured value of an absorbance at the predetermined measurement wavelength. The component measurement device 1 according to the present embodiment performs this correction and calculates a concentration of the measurement target component.

In the present embodiment, the component measurement device 1 can measure the measurement target component in the sample on the basis of optical characteristics of the mixture X containing a coloring component generated by a coloring reaction between the sample and the measurement reagent 22. Specifically, in the present embodiment, the component measurement device 1 measures a concentration of glucose contained in a plasma component in the sample.

Here, a principle of measuring the glucose concentration and the wavelengths $\lambda 1$ to $\lambda 5$ of irradiation light emitted from the first light source 67 to the fifth light source 68d, respectively, will be described. Hemoglobin in a red blood cell mainly contains oxyhemoglobin bonded to oxygen and deoxyhemoglobin in which oxygen is dissociated at a place where an oxygen partial pressure is small. Deoxyhemoglobin passes through the lung and is bonded to oxygen to generate oxyhemoglobin, oxyhemoglobin plays a role of transporting oxygen into the body through the artery, and a large amount of oxyhemoglobin can be confirmed in arterial blood. For example, when blood as a sample is collected from a pulp of a finger, the blood is capillary blood, and therefore contains a relatively large amount of oxyhemoglobin. Conversely, a large amount of deoxyhemoglobin can be confirmed in venous blood.

As an existing technique, it is common to correct an absorbance obtained at a measurement wavelength corresponding to a coloring component to be measured by using, for example, a hematocrit value without considering a ratio between deoxyhemoglobin and oxyhemoglobin. However, an absorption coefficient of deoxyhemoglobin is not the same as an absorption coefficient of oxyhemoglobin, and an absorption amount by deoxyhemoglobin and an absorption amount by oxyhemoglobin vary depending on a wavelength. For example, when the measurement wavelength at which the absorbance of the coloring component to be measured is measured is 660 nm, the absorption coefficient of deoxyhemoglobin is about 0.9, and the absorption coefficient of oxyhemoglobin is about 0.09. That is, when a ratio between oxyhemoglobin and deoxyhemoglobin is 1:1, the absorption coefficient of oxyhemoglobin corresponds to about 10% of the absorption coefficient of the total hemoglobin. In order to more accurately estimate the absorbance derived from the coloring component to be measured, it is important to consider a ratio between deoxyhemoglobin and oxyhemoglobin.

Therefore, in the component measurement device 1, the measurement wavelength (first predetermined wavelength $\lambda 1$) at which the absorbance of the coloring component contained in the mixture X is measured is 660 nm. The component measurement device 1 performs correction to remove, as a disturbance factor (noise), an influence of light scattering of a hemocyte component or the like and an influence of light absorption of hemoglobin in consideration of a ratio between deoxyhemoglobin and oxyhemoglobin from a measured value of the absorbance of the mixture X measured at the measurement wavelength. Thus, the component measurement device 1 estimates the absorbance of the coloring component contained in the mixture X, and calculates a glucose concentration using a calibration curve indicating a relationship between the estimated absorbance and the glucose concentration.

Hereinafter, further details of the component measurement method executed by the component measurement device 1 will be described.

First, in the color-developing reagent in the measurement reagent 22 used in the present embodiment, the absorbance of the coloring component generated by the coloring reaction with glucose in the sample has a peak around 600 nm, and in the present embodiment, the measurement wavelength at which the absorbance of the coloring component is measured is 660 nm.

As the measurement wavelength at which the absorbance of the coloring component to be measured is measured, it is only required to use a wavelength at which a light absorptivity of the coloring component is relatively large and at which an influence of light absorption of hemoglobin is relatively small. Specifically, it is only required to use a wavelength belonging to a wavelength range W3 which corresponds to a full width at half maximum of a peak wavelength region in an absorbance spectrum of the coloring component to be measured and in which a ratio of an absorbance due to light absorption of hemoglobin to a total absorbance is relatively small. The wavelength range "corresponding to a full width at half maximum of a peak wavelength region" means a range from a wavelength indicating a half value on a short wavelength side to a wavelength indicating a half value on a long wavelength side when the full width at half maximum of the peak wavelength region in the absorbance spectrum is specified. In the absorbance spectrum of the coloring component to be measured in the present embodiment, a peak wavelength is around 600 nm, and a wavelength range corresponding to the full width at half maximum is about 500 nm to about 700 nm. In addition, the influence of light absorption of hemoglobin in the total absorbance is relatively small in a wavelength region of 600 nm or more. Therefore, in the present embodiment, the wavelength range W3 which corresponds to a full width at half maximum of a peak wavelength region in an absorbance spectrum of the coloring component to be measured and in which a ratio of an absorbance due to light absorption of hemoglobin to a total absorbance is relatively small is 600 nm or more and 700 nm or less. Therefore, the measurement wavelength is not limited to 660 nm in the present embodiment, and another wavelength belonging to the range of 600 nm to 700 nm may be used as the measurement wavelength. The absorbance derived from the coloring component can be more accurately measured by using a wavelength range in which a signal indicating the absorbance of the coloring component is strong and the ratio of the absorbance due to light absorption of hemoglobin to the total absorbance is small as much as possible. Therefore, the measurement wavelength is preferably around 660 nm which is slightly longer than the vicinity of 600 nm which is a peak wavelength in the absorbance spectrum of the coloring component. More specifically, the measurement wavelength is preferably in a range of 630 nm to 680 nm, more preferably in a range of 640 nm to 670 nm, and particularly preferably 660 nm as in the present embodiment. As an example of such a color-developing reagent, a tetrazolium salt is preferable.

Furthermore, in the present embodiment, the color-developing reagent in which the full width at half maximum of the peak wavelength region in the absorbance spectrum of the coloring component is about 500 nm to about 700 nm is used, but a color-developing reagent in which the full width at half maximum of the peak wavelength region is out of this range may be used. Note that, as described above, in consideration of light absorption characteristics of hemoglobin, desirably, the wavelength region (600 nm or less) in which the absorbance due to light absorption of hemoglobin is large and the measurement wavelength in the absorbance spectrum of the coloring component do not overlap with each other.

Hereinafter, a method for estimating the absorbance of the coloring component at a measurement wavelength of 660 nm in the present embodiment will be described. The component measurement device 1 measures the absorbance of the mixture X at each of four wavelengths, that is, the second predetermined wavelength $\lambda 2$ to the fifth predetermined wavelength $\lambda 5$ different from the measurement wavelength (660 nm). The component measurement device 1 corrects the first measured value D1 of the absorbance of the mixture X at the measurement wavelength using these four values, that is, the second measured value D2 to the fifth measured value D5 and the correction coefficient data determined in advance, and estimates the absorbance of the coloring component at the measurement wavelength. The measurement wavelength in the present embodiment is the above-described first predetermined wavelength $\lambda 1$.

The component measurement device 1 uses, as the above-described second measured value D2 and third measured value D3, two values, that is, the second measured value D2 and the third measured value D3 of the absorbance of the mixture X at two wavelengths, that is, the second predetermined wavelengths $\lambda 2$ and the third predetermined wavelength $\lambda 3$, respectively, on a longer wavelength side than the first predetermined wavelength $\lambda 1$ that is the measurement wavelength. The component measurement device 1 uses, as the above-described fourth measured value D4 and fifth measured value D5, two values, that is, the fourth measured value D4 and the fifth measured value D5 of the absorbance of the mixture X at two wavelengths, that is, the fourth predetermined wavelengths $\lambda 4$ and the fifth predetermined wavelength $\lambda 5$, respectively, on a shorter wavelength side than the first predetermined wavelength $\lambda 1$ that is the measurement wavelength.

More specifically, the component measurement device 1 uses, as the above-described second measured value D2 and third measured value D3, two values, that is, the second measured value D2 and the third measured value D3 of the absorbance of the mixture X at two wavelengths, that is, the second predetermined wavelengths λ2 and the third predetermined wavelength λ3, respectively, belonging to a wavelength region which is on a longer wavelength side than the first predetermined wavelength λ1 that is the measurement wavelength and in which an influence of light scattering of a hemocyte component or the like is dominant in the total absorbance. The component measurement device 1 uses, as the above-described fourth measured value D4 and fifth measured value D5, two values, that is, the fourth measured value D4 and the fifth measured value D5 of the absorbance of the mixture X at two wavelengths, that is, the fourth predetermined wavelengths λ4 and the fifth predetermined wavelength λ5, respectively, belonging to a wavelength region which is on a shorter wavelength side than the first predetermined wavelength λ1 that is the measurement wavelength and in which an influence of light absorption of hemoglobin is large in the total absorbance.

In other words, the component measurement device 1 uses, as the above-described second measured value D2 and third measured value D3, absorbances of the mixture X at the second predetermined wavelength λ2 and the third predetermined wavelength λ3, respectively, belonging to a longer wavelength region than the measurement wavelength belonging to the wavelength range corresponding to the full width at half maximum of the peak wavelength region in the absorbance spectrum of the coloring component to be measured, for example, belonging to a long wavelength region W1 on a longer wavelength side than the wavelength range W3.

In addition, the component measurement device 1 uses, as the above-described fourth measured value D4 and fifth measured value D5, the fourth measured value D4 and the fifth measured value D5 which are absorbances of the mixture X at the fourth predetermined wavelengths λ4 and the fifth predetermined wavelength λ5, respectively, belonging to a shorter wavelength region than the measurement wavelength belonging to the wavelength range corresponding to the full width at half maximum of the peak wavelength region in the absorbance spectrum of the coloring component to be measured, for example, belonging to a short wavelength region W2 on a shorter wavelength side than the wavelength range W3.

In the component measurement device 1, the control unit 50 acquires the above-described first measured value D1 to fifth measured value D5 from the photometric unit 51. Specifically, the mixture X is irradiated with irradiation light including emission wavelengths of the first predetermined wavelength λ1 to the fifth predetermined wavelength λ5 from the first light source 67 to the fifth light source 68d of the light emitting unit 66, respectively. The light receiving unit 72 receives transmission light that passes through the mixture X among the irradiation light beams. Then, the control unit 50 calculates an absorbance of the mixture X at each of the wavelengths from a relationship between the irradiation light and the transmission light, and stores the first measured value D1 to the fifth measured value D5, which are absorbances of the mixture X at the wavelengths, respectively, in the storage unit 52 as measured value data. The control unit 50 can acquire measured value data from the storage unit 52. A means by which the control unit 50 acquires the first measured value D1 to the fifth measured value D5 is not limited to the means described above, and the control unit 50 can acquire the first measured value D1 to the fifth measured value D5 by various known means.

Then, the control unit 50 corrects the first measured value D1 using the second measured value D2 to the fifth measured value D5, and estimates an absorbance of the coloring component at the first predetermined wavelength λ1 (660 nm in this example) that is the measurement wavelength. In the long wavelength region W1 in which light scattering of a hemocyte component or the like is dominant, an absorbance spectrum of the mixture X is substantially linear. Therefore, the component measurement device 1 acquires the second measured value D2 that is an absorbance at the second predetermined wavelength λ2 and the third measured value D3 that is an absorbance at the third predetermined wavelength λ3, and determines a slope between the second measured value D2 and the third measured value D3. As a result, the component measurement device 1 can estimate, to some extent, an absorbance caused by a disturbance factor (noise) other than the absorbance caused by the coloring component at the first predetermined wavelength λ1 that is the measurement wavelength.

In addition, the component measurement device 1 can calculate a glucose concentration in the sample in consideration of a ratio between deoxyhemoglobin and oxyhemoglobin in a red blood cell in addition to the optical characteristics due to a hemocyte component and the like in the sample. Therefore, the component measurement device 1 can perform correction with higher accuracy by using two wavelengths (the fourth predetermined wavelength and the fifth predetermined wavelength) selected according to the ratio between deoxyhemoglobin and oxyhemoglobin.

Specifically, the component measurement device 1 uses, as the fourth predetermined wavelength λ4, a wavelength at which a difference in absorption coefficient between deoxyhemoglobin and oxyhemoglobin is equal to or less than a first predetermined value. Furthermore, the component measurement device 1 uses, as the fifth predetermined wavelength λ5, a wavelength at which a difference in absorption coefficient between deoxyhemoglobin and oxyhemoglobin is more than the above-described first predetermined value. More specifically, the component measurement device 1 uses, as the fourth predetermined wavelength λ4, a wavelength at which a ratio of an absorption coefficient of oxyhemoglobin to an absorption coefficient of deoxyhemoglobin is equal to or more than a first threshold as a predetermined threshold. Furthermore, the component measurement device 1 uses, as the fifth predetermined wavelength λ5, a wavelength at which the ratio of an absorption coefficient of oxyhemoglobin to an absorption coefficient of deoxyhemoglobin is less than the above-described first threshold. In other words, the component measurement device 1 uses, as the fourth predetermined wavelength λ4 and the fifth predetermined wavelength λ5, two wavelengths, that is, a wavelength at which the ratio of an absorption coefficient of oxyhemoglobin to an absorption coefficient of deoxyhemoglobin is equal to or more than the first threshold and a wavelength at which the ratio is less than the first threshold. As a result, when correcting the first measured value D1 using the second measured value D2 to the fifth measured value D5, the control unit 50 can perform correction with higher accuracy in consideration of a ratio between deoxyhemoglobin and oxyhemoglobin.

The two wavelengths selected by a ratio between deoxyhemoglobin and oxyhemoglobin are preferably two wavelengths at which a difference in light absorption of hemoglobin due to the ratio between deoxyhemoglobin and oxyhemoglobin is large. Therefore, in the present embodiment, as the fourth predetermined wavelength λ4, a wavelength at which the ratio of an absorption coefficient of oxyhemoglobin to an absorption coefficient of deoxyhemoglobin is 0.8 or more is used. In addition, as the fifth predetermined wavelength λ5, a wavelength at which the ratio of an absorption coefficient of oxyhemoglobin to an absorption coefficient of deoxyhemoglobin is less than 0.8 is preferably used. In the present embodiment, as an example, the fourth predetermined wavelength λ4 is 520 nm and the fifth predetermined wavelength λ5 is 589 nm.

As described above, the fourth predetermined wavelength λ4 and the fifth predetermined wavelength λ5 at which a difference in light absorption of the entire hemoglobin is large in the short wavelength region W2 in which the light absorption of the entire hemoglobin largely varies depending on a ratio between deoxyhemoglobin and oxyhemoglobin are used. As a result, an absorbance of noise at the first predetermined wavelength λ1 (660 nm in the present embodiment) that is the measurement wavelength can be accurately estimated in consideration of a ratio between deoxyhemoglobin and oxyhemoglobin. Therefore, the component measurement device 1 can accurately perform the absorbance caused by the coloring component at the first predetermined wavelength λ1 that is the measurement wavelength, and furthermore measurement of the measurement target component (glucose concentration measurement in the present embodiment).

In the present embodiment, only the fourth predetermined wavelength λ4 and the fifth predetermined wavelength λ5 are used as wavelengths that largely consider an influence of a ratio between deoxyhemoglobin and oxyhemoglobin, but it is more preferable to use similar wavelengths for the second predetermined wavelength λ2 and the third predetermined wavelength λ3 in addition to the fourth predetermined wavelength λ4 and the fifth predetermined wavelength λ5.

Specifically, as the second predetermined wavelength λ2 in the long wavelength region W1 in which light scattering of a hemocyte component or the like is dominant, a wavelength at which a difference in absorption coefficient between deoxyhemoglobin and oxyhemoglobin is equal to or less than a second predetermined value is used. Furthermore, similarly, as the third predetermined wavelength λ3 in the long wavelength region W1, a wavelength at which the difference is larger than the second predetermined value is used. More specifically, as the second predetermined wavelength λ2, it is preferable to use a wavelength at which the ratio of an absorption coefficient of oxyhemoglobin to an absorption coefficient of deoxyhemoglobin is equal to or more than the above-described first threshold and equal to or less than a second threshold. Furthermore, similarly, as the third predetermined wavelength λ3 in the long wavelength region W1, it is preferable to use a wavelength at which the ratio of an absorption coefficient of oxyhemoglobin to an absorption coefficient of deoxyhemoglobin is less than the above-described first threshold or a wavelength at which the ratio is more than the second threshold. The second threshold is a predetermined threshold different from the first threshold and more than the first threshold. That is, as the second predetermined wavelength λ2 and the third predetermined wavelength λ3, it is preferable to use two wavelengths at which the ratios of an absorption coefficient of oxyhemoglobin to an absorption coefficient of deoxyhemoglobin are in different ranges. As a result, when correcting the first measured value D1 using the second measured value D2 to the fifth measured value D5, the control unit 50 can perform correction with high accuracy in further consideration of the ratio between deoxyhemoglobin and oxyhemoglobin.

In particular, in the long wavelength region W1, an influence of light scattering of a hemocyte component or the like is dominant, but an influence of light absorption of hemoglobin is also included to the same extent as the measurement wavelength of the measurement target component. Therefore, as the second predetermined wavelength λ2 and the third predetermined wavelength λ3, it is preferable to use two wavelengths at which light absorption of hemoglobin changes relatively largely depending on the ratio between deoxyhemoglobin and oxyhemoglobin.

Therefore, in the present embodiment, it is preferable to use, as the second predetermined wavelength λ2, a wavelength at which the ratio of an absorption coefficient of oxyhemoglobin to an absorption coefficient of deoxyhemoglobin is 0.8 or more and 1.5 or less. In the present embodiment, as an example, the second predetermined wavelength λ2 is 850 nm. Note that the second predetermined wavelength λ2 is selected from a range of 790 nm to 850 nm.

The third predetermined wavelength λ3 is in the long wavelength region W1 and is a wavelength at which the absorbance of the coloring component included in the total absorbance at the third predetermined wavelength λ3 is 10% or less, preferably 6% or less, more preferably 3% or less, and still more preferably substantially 0% of the absorbance of the coloring component included in the total absorbance at the measurement wavelength. In other words, it is particularly preferable to use a wavelength equal to or longer than a wavelength at a tail of a long wavelength side of a peak wavelength region of an absorbance spectrum of the coloring component. As a result, an influence of the light absorption of the coloring component can be eliminated, and noise in which an influence of light scattering of a hemocyte component or the like in the long wavelength region W1 is dominant can be more accurately estimated. In the present embodiment, the third predetermined wavelength λ3 is a wavelength selected from 920 to 950 nm, and is 940 nm as an example. As the third predetermined wavelength λ3, it is particularly preferable to use a wavelength at which the absorbance of the coloring component is zero, that is, a wavelength at a tail of a long wavelength side of a peak wavelength region of an absorbance spectrum of the coloring component. Note that, the above-described "total absorbance" in "the absorbance of the coloring component included in the total absorbance" means an absorbance obtained by measuring a mixture containing the sample and/or the coloring component. The "absorbance of the coloring component" in the "absorbance of the coloring component included in the total absorbance" means an absorbance of a reaction product generated by a coloring reaction between the measurement target component in the sample and the color-developing reagent in the reagent, that is, an absorbance derived from the coloring component.

As described above, the component measurement device 1 can correct the first measured value D1, which is a measured value of an absorbance of the mixture X at the measurement wavelength, using the second measured value D2 to the fifth measured value D5, which are the measured values of the absorbance of the mixture X at the second predetermined wavelength λ2 to the fifth predetermined wavelength λ5, respectively, and can estimate the absorbance of the coloring component at the measurement wavelength.

Next, a method for correction processing by the control unit 50 of the component measurement device 1 will be described.

As described above, the storage unit 52 of the component measurement device 1 stores measured value data of the first measured value D1 to the fifth measured value D5, correction coefficient data, and calibration curve data. The first measured value D1 to the fifth measured value D5 are absorbances of the mixture X at the first predetermined wavelength λ1 to the fifth predetermined wavelength λ5 measured by the photometric unit 51, respectively. The correction coefficient data is a group of correction coefficient data correlated with absorbances of the mixture X at the second predetermined wavelength λ2 to the fifth predetermined wavelength λ5, respectively. The calibration curve data indicates a relationship between the absorbance of the coloring component in the mixture X obtained by correcting the absorbance of the mixture X measured at the first predetermined wavelength λ1 with the correction coefficient data and various physical quantities.

The control unit 50 derives the absorbance of the coloring component at the first wavelength λ1 that is the measurement wavelength on the basis of the measured value data and the correction coefficient data stored in the storage unit 52.

Here, the correction coefficient data is derived by regression analysis performed in advance using a formula expressed by the following mathematical formula (1).

[Mathematical formula 1]

$$B(\lambda 1)=b0+b1*B(\lambda 2)+b2*B(\lambda 3)+b3*B(\lambda 4)+b4*B(\lambda 5) \quad (1)$$

$B(\lambda)$ means an absorbance caused by a disturbance factor (noise) other than the absorbance of the coloring component at the wavelength λ, and regression calculation is performed using various types of blood specimens according to the formula expressed by the above mathematical formula (1) to derive coefficients b0, b1, b2, b3, and b4. As described above, in the present embodiment, 850 nm is used as the second predetermined wavelength λ2, 940 nm is used as the third predetermined wavelength λ3, 520 nm is used as the fourth predetermined wavelength λ4, and 589 nm is used as the fifth predetermined wavelength λ5. In addition, the various types of blood specimens are based on six blood specimens having different component compositions. Blood specimens each having a hematocrit value adjusted in a range of 10% to 70% are prepared, absorbance spectra of the adjusted blood specimens are measured, and the coefficients b0, b1, b2, b3, and b4 are derived using regression analysis. On the basis of these derived coefficients b0 to b4, a group of correction coefficients correlated with the absorbances of the mixture X at the second predetermined wavelength λ2 to the fifth predetermined wavelength λ5, respectively, is derived. By using correction coefficient data including the correction coefficients, the measured value of the absorbance of the mixture X at 660 nm that is the measurement wavelength can be corrected from the measured values of the absorbance of the mixture X at 520 nm, 589 nm, 850 nm, and 940 nm, and the absorbance of the coloring component at 660 nm can be estimated.

Note that, in order to more easily determine a blood glucose level, by simplifying the above-described formula and correcting the measured value of the absorbance of the mixture X at 660 nm that is the measurement wavelength from the measured values of the absorbances of the mixture X at 520 nm that is the fourth predetermined wavelength λ4 and at 850 nm that is the second predetermined wavelength λ2, the absorbance of the coloring component at 660 nm can also be estimated.

Figure 9:
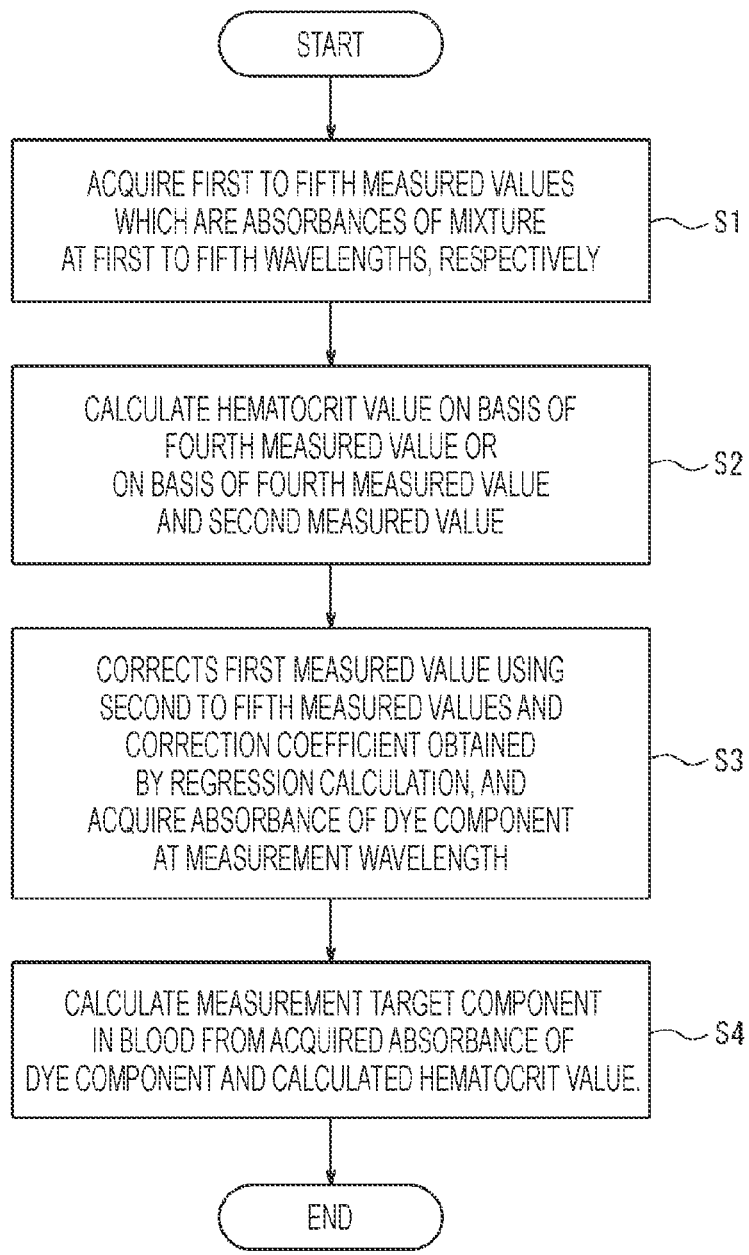
FIG. 9 is a flowchart illustrating an example of component measuring processing executed by the component measurement device in FIG. 1.

FIG. 9 is a flowchart illustrating an example of component measuring processing executed by the component measurement device 1. As illustrated in FIG. 9, the component measuring processing includes steps S1 to S4. In step S1, the component measurement device 1 acquires the first measured value D1 that is the absorbance of the mixture X at the first predetermined wavelength λ1 as the measurement wavelength, the second measured value D2 that is the absorbance of the mixture X at the second predetermined wavelength λ2, the third measured value D3 that is the absorbance of the mixture X at the third predetermined wavelength λ3, the fourth measured value D4 that is the absorbance of the mixture X at the fourth predetermined wavelength λ4, and the fifth measured value D5 that is the absorbance of the mixture X at the fifth predetermined wavelength λ5. In step S2, the component measurement device 1 derives a hematocrit value using at least one of the first measured value D1 to the fifth measured value D5. In step S3, the component measurement device 1 corrects the first measured value D1 using the second measured value D2 to the fifth measured value D5 and the correction coefficient obtained by regression calculation, and acquires an absorbance of the coloring component at the first predetermined wavelength λ1 as the measurement wavelength. In step S4, the component measurement device 1 calculates the measurement target component in the sample from the absorbance of the coloring component at the first predetermined wavelength λ1 as the measurement wavelength and the derived hematocrit value.

In step S1, as described above, the first measured value D1 to the fifth measured value D5 are acquired using the light emitting unit 66 and the light receiving unit 72 in the photometric unit 51. In the present embodiment, in step S2, a hematocrit value is derived on the basis of the fourth measured value D4 or on the basis of the fourth measured value D4 and the second measured value D2. Specifically, in step S2, the absorbance of hemoglobin is estimated from the fourth measured value D4 or from the fourth measured value D4 and the second measured value D2, and the hematocrit value is derived. Furthermore, when the fourth measured value D4 or the fourth measured value D4 and the second measured value D2 include absorption of the coloring component, the hematocrit value is derived from a correction value acquired by performing correction calculation of subtracting an absorption component of the coloring component from the fourth measured value D4 or from the fourth measured value D4 and the second measured value D2. In the present embodiment, the hematocrit value is derived from a calibration curve indicating a relationship between the absorbance of hemoglobin in the mixture X and the hematocrit value, stored in the storage unit 52. In step S3, actually, the first measured value D1 is corrected using the second measured value D2 to the fifth measured value D5 and a correction coefficient obtained by the regression calculation, and the absorbance of the coloring component at the first measurement wavelength is estimated and acquired. Note that, when absorption of the coloring component is included in the second measured value D2 to the fifth measured value D5, recalculation is performed from a correction value acquired by performing correction calculation of subtracting an absorption component of the coloring component from each of the measured values, and the absorbance of the coloring component at the first predetermined wavelength λ1 is estimated and acquired. Finally, in step S4, a glucose concentration is calculated from the acquired absorbance of the coloring component at the first predetermined wavelength λ1 that is the measurement wavelength and the derived hematocrit value using a calibration curve indicating a relationship with the glucose concentration.

Next, processing of determining abnormality of the component measurement chip 2, which is executed by the control unit 50 of the component measurement device 1, will be described. When executing the component measuring processing, the control unit 50 of the component measurement device 1 executes processing of determining whether or not the component measurement chip 2 attached to the component measurement device 1 has such abnormality that affects the processing of measuring the measurement target component by the component measurement device 1 according to a predetermined algorithm. Hereinafter, details of the abnormality determining processing executed by the control unit 50 when the control unit 50 executes the component measuring processing will be described.

In the present embodiment, the control unit 50 can execute processing of determining whether or not the component measurement chip 2 has been inserted into the component measurement device 1 (insertion determining processing). In the present embodiment, a description will be given below assuming that the control unit 50 also executes the abnormality determining processing when performing the insertion determining processing.

Figure 10:
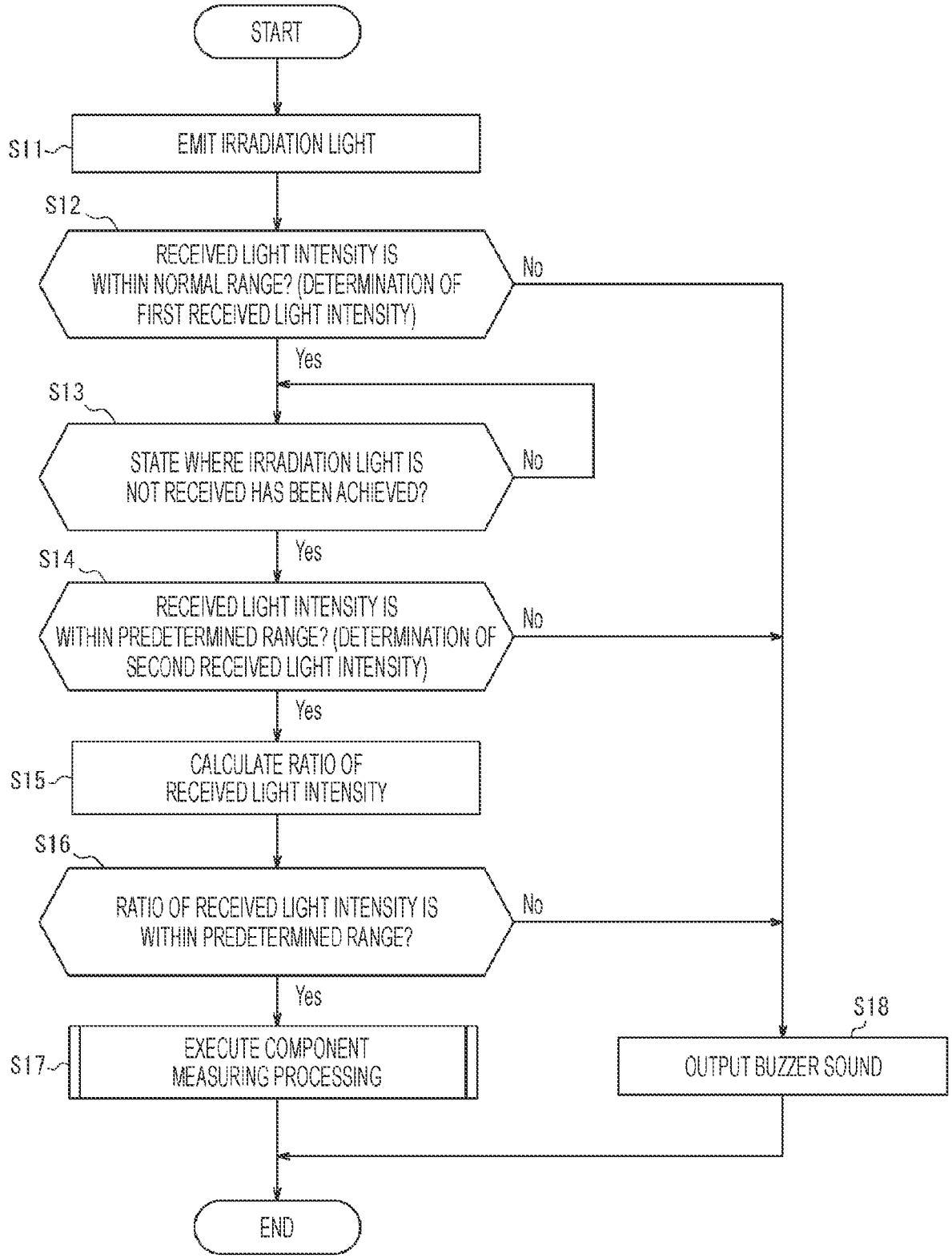
FIG. 10 is a flowchart illustrating an example of abnormality determining processing executed by the component measurement device in FIG. 1 when the component measurement device performs component measuring processing.

FIG. 10 is a flowchart illustrating an example of the abnormality determining processing executed by the component measurement device 1 when the component measurement device 1 performs the component measuring processing. The flow of FIG. 10 is executed, for example, when an operator inputs start of processing to the component measurement device 1.

Figure 11:
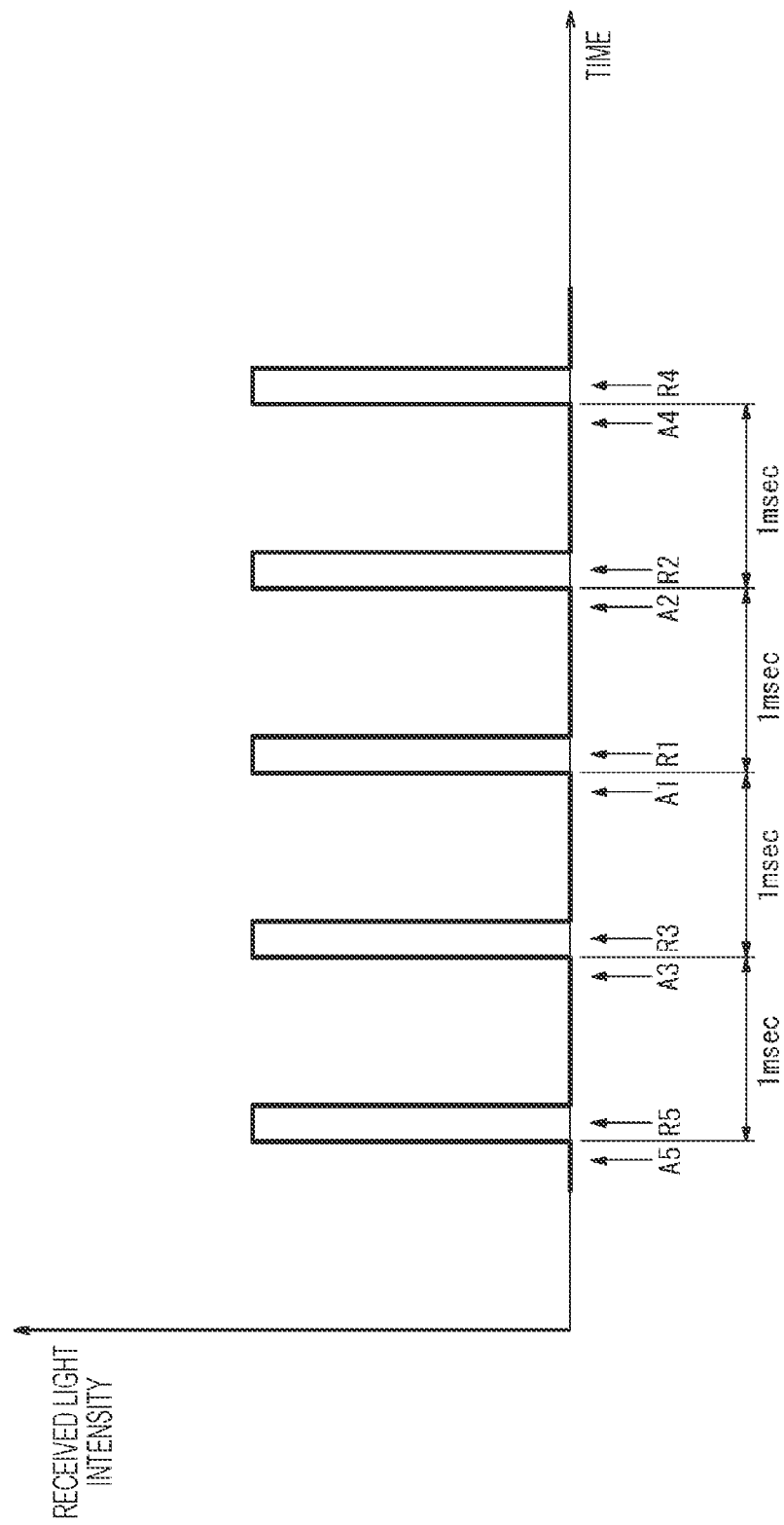
FIG. 11 is a diagram schematically illustrating a received light intensity of one set of irradiation light emitted from a first light source to a fifth light source in FIG. 7, received by a light receiving unit.

Here, when executing the component measuring processing, the control unit 50 causes irradiation light to be emitted from the first light source 67 to the fifth light source 68d, in which processing of causing the first light source 67 to the fifth light source 68d to sequentially emit irradiation light one time as pulse light is defined as one set. FIG. 11 is a diagram schematically illustrating one set of irradiation light emitted from the first light source 67 to the fifth light source 68d, and is a graph illustrating received light intensities of the irradiation light emitted from the first light source 67 to the fifth light source 68d, received by the light receiving unit 72. In FIG. 11, the horizontal axis represents time and the vertical axis represents a received light intensity. As illustrated in FIG. 11, the control unit 50 causes the first light source 67 to the fifth light source 68d to sequentially emit light at a predetermined time interval. In the example illustrated in FIG. 11, the control unit 50 causes the first light source 67 to the fifth light source 68d to emit light every 1 msec as a predetermined time interval. In addition, as illustrated in FIG. 11, the control unit 50 causes the first light source 67 to the fifth light source 68d to emit light such that received light intensities of the irradiation light beams from the first light source 67 to the fifth light source 68d in the light receiving unit 72 are substantially the same intensity. The substantially same intensity means that, in a case in which the component measuring processing is executed with the received light intensity in the light receiving unit 72, a difference between the received light intensities obtained from light emission of the light sources is within a range that does not affect a result of the component measuring processing.

Here, the control unit 50 causes the first light source 67 to the fifth light source 68d to emit light in a predetermined order in one set of emission processing. For example, in the example illustrated in FIG. 11, the control unit 50 causes the fifth light source 68d, the third light source 68b, the first light source 67, the second light source 68a, and the fourth light source 68c to emit irradiation light to a measurement region in this order in one set of emission processing. Therefore, the light receiving unit 72 receives the irradiation light at a predetermined time interval (1 msec) in order of the fifth predetermined wavelength λ5, the third predetermined wavelength λ3, the measurement wavelength (first predetermined wavelength λ1), the second predetermined wavelength λ2, and the fourth predetermined wavelength λ4. Note that the control unit 50 does not need to cause the fifth light source 68d, the third light source 68b, the first light source 67, the second light source 68a, and the fourth light source 68c to emit irradiation light in this order in one set of emission processing.

With reference to FIG. 10, when detecting an operation input for starting processing by, for example, an operator of the component measurement device 1, the control unit 50 starts emission of irradiation light by the first light source 67 to the fifth light source 68d (step S11). At this time, the control unit 50 causes the first light source 67 to the fifth light source 68d to emit irradiation light so as to be able to detect whether or not the component measurement chip 2 has been attached to the component measurement device 1.

Figure 12:
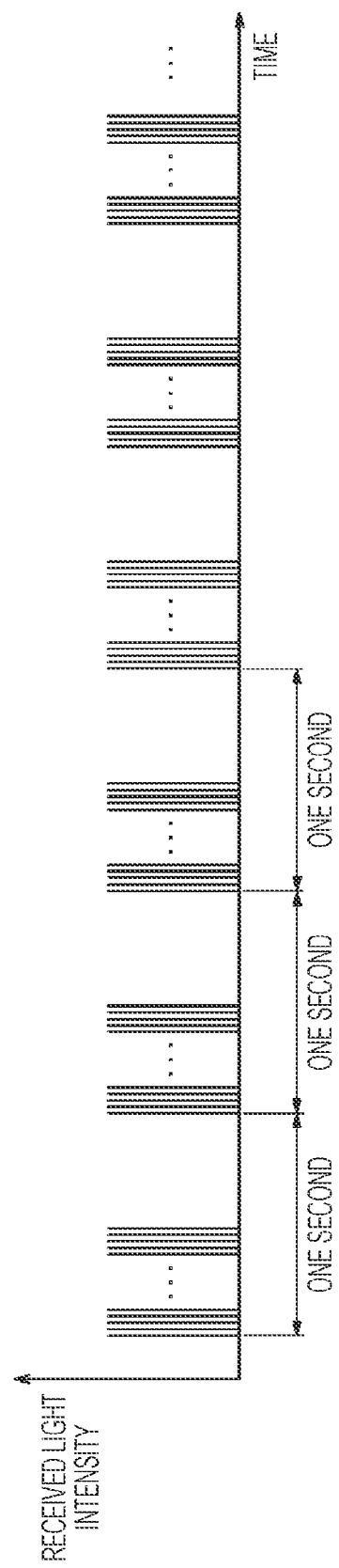
FIG. 12 is a diagram schematically illustrating received light intensities of irradiation light emitted from the first light source to the fifth light source, received by the light receiving unit.

FIG. 12 is a diagram schematically illustrating received light intensities of irradiation light emitted from the first light source 67 to the fifth light source 68d, received by the light receiving unit 72 in step S11 of FIG. 10. In FIG. 12, the horizontal axis represents time and the vertical axis represents a received light intensity. As schematically illustrated in FIG. 12, the control unit 50 repeatedly outputs the set of emission processing described in FIG. 11. For example, the control unit 50 repeatedly executes the set of emission processing 1 to 200 times per second. In the present embodiment, the control unit 50 repeatedly executes the set of emission processing 16 times per second. After repeating the set of emission processing 16 times, the control unit 50 stops output of irradiation light. Then, after a predetermined time (here, one second) has elapsed from start of the 16 sets of emission processing, the control unit 50 repeatedly executes and outputs the set of emission processing 16 times again without interruption. After repeating the set of emission processing 16 times, the control unit 50 stops output of irradiation light again. As described above, the control unit 50 repeats a pair of the output of the 16 sets of emission processing and the output stop of irradiation light every one second until reaching step S14 described later.

Next, the control unit 50 executes determination of the first received light intensity (step S12). Specifically, in the first received light intensity determining processing, the control unit 50 determines whether or not the received light intensity in the light receiving unit 72 is within a normal range (step S12).

If the control unit 50 determines that the received light intensity in the light receiving unit 72 is not within the normal range (No in step S12), the control unit 50 outputs a buzzer sound from the buzzer unit 59, for example, to notify that an error has occurred (step S18).

If the control unit 50 determines that the received light intensity in the light receiving unit 72 is within the normal range (Yes in step S12), the control unit 50 determines whether or not the component measurement chip 2 has been inserted into the chip insertion space S on the basis of a change in the received light intensity in the light receiving unit 72. Specifically, the control unit 50 determines whether or not the component measurement chip 2 has been inserted into the chip insertion space S in step S14. Alternatively, the control unit 50 may determine whether or not the component measurement chip 2 has been inserted into the chip insertion space S in steps S13 and S14.

More specifically, for example, an operator attaches the component measurement chip 2 to the component measurement device 1. That is, the operator inserts the component measurement chip 2 into the chip insertion space S of the component measurement device 1. While the component measurement chip 2 is being inserted into the chip insertion space S, at least a part of irradiation light emitted from the first light source 67 to the fifth light source 68d is absorbed by a member constituting the component measurement chip 2 and does not reach the light receiving unit 72. Then, when the component measurement chip 2 is attached to the component measurement device 1 and is put into the state illustrated in FIGS. 2 and 3, an optical path is formed between the first light source 67 to the fifth light source 68d and the light receiving unit 72 through a part of the component measurement chip 2. The part where the optical path is formed in the component measurement chip 2 is a measurement spot. In the present embodiment, the measurement reagent 22 is located in the middle of the optical path. That is, the measurement spot is located on the measurement reagent 22. Therefore, among irradiation light beams emitted from the first light source 67 to the fifth light source 68d toward a measurement region, only some light beams that have passed through the measurement reagent 22 are received by the light receiving unit 72. That is, when the component measurement chip 2 is attached to the component measurement device 1, there is a difference in received light intensity in the light receiving unit 72 as compared with a case in which the component measurement chip 2 is not attached.

From this, the control unit 50 determines whether or not the component measurement chip 2 has been attached to the component measurement device 1 by detecting a change in received light intensity in the light receiving unit 72. In a case in which the control unit 50 detects that the received light intensity in the light receiving unit 72 is within a predetermined range in which the component measurement chip 2 is estimated to have been inserted into the chip insertion space S after the light reception amount in the light receiving unit 72 is less than a predetermined amount (that is, at least a part of irradiation light is blocked by a member constituting the component measurement chip 2 and does not reach the light receiving unit 72), the control unit 50 determines that the component measurement chip 2 has been inserted into the chip insertion space S.

In the present embodiment, if the control unit 50 detects that the received light intensity in the light receiving unit 72 is within a predetermined range in which the component measurement chip 2 is estimated to have been be inserted into the chip insertion space S on the basis of the received light intensity in the light receiving unit before the component measurement chip 2 is inserted into the chip insertion space S, the control unit 50 determines that the component measurement chip 2 has been inserted into the chip insertion space S (step S14).

Note that, in a case in which a part other than the measurement target portion is formed of a light shielding member as the component measurement chip 2, it may be determined whether or not the component measurement chip 2 has been inserted by detecting that the received light intensity is within a predetermined range after a state in which a light amount is not detected by the light receiving unit 72 (that is, irradiation light is blocked by a member constituting the component measurement chip 2 and does not reach the light receiving unit 72) is achieved. In this case, first, the control unit 50 determines whether or not a state in which irradiation light is not received in the light receiving unit 72 has been achieved (step S13). In the present specification, the state in which irradiation light is not received includes a case in which a light amount of a received light intensity to such an extent detected by the light receiving unit 72 in a case in which irradiation light emitted from the first light source 67 to the fifth light source 68d is blocked by the component measurement chip 2 is detected. Whether or not the state in which irradiation light is not received has been achieved can be determined, for example, by setting a threshold in advance and determining whether or not an output value of a received light intensity in the light receiving unit 72 from an AD converter is below the threshold. If the control unit 50 determines that the state in which irradiation light is not received in the light receiving unit 72 has not been achieved (No in step S13), the control unit 50 repeats step S13 until the control unit 50 determines that the state in which irradiation light is not received in the light receiving unit 72 has been achieved. If the control unit 50 determines that the state in which irradiation light is not received in the light receiving unit 72 has been achieved (Yes in step S13), the control unit 50 executes second received light intensity determining processing (step S14). Note that step S13 may be omitted, and step S12 and step S14 may be performed.

Figure 13:
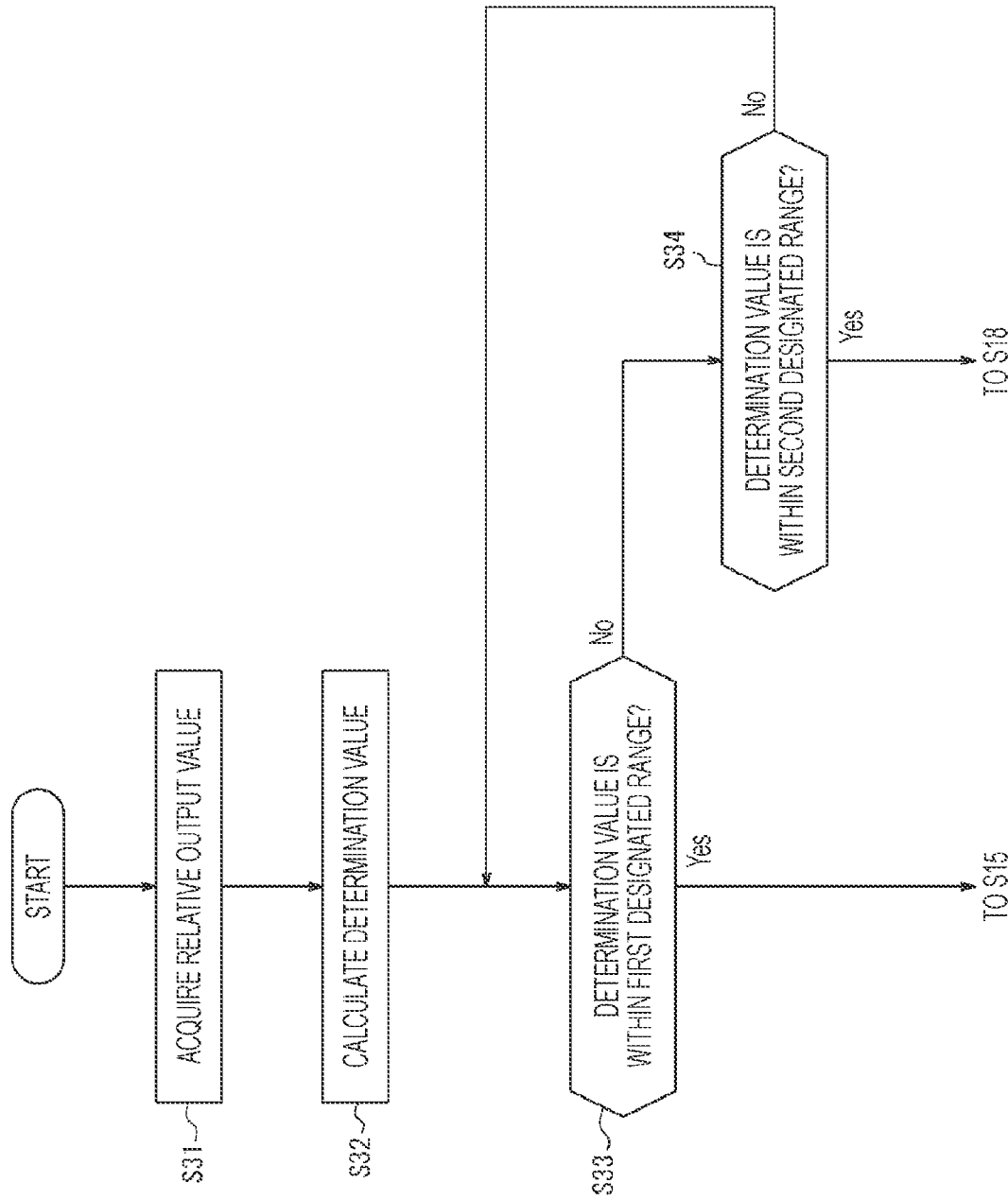
FIG. 13 is a flowchart illustrating an example of second received light intensity determining processing.

The second received light intensity determining processing is processing for determining whether or not the component measurement chip 2 has been attached to (inserted into) the component measurement device 1. FIG. 13 is a flowchart illustrating an example of the second received light intensity determining processing, and is a flowchart illustrating details of step S14 in FIG. 10.

First, the control unit 50 acquires a relative output value corresponding to a received light intensity from the light receiving unit 72 (step S31). Here, the relative output value refers to a difference between an output value from an AD converter connected to the light receiving unit 72 when light is emitted from the light emitting unit 66 (the first light source 67 to the fifth light source 68d) and an output value from the AD converter connected to the light receiving unit 72 when light is not emitted from the light emitting unit 66 (the first light source 67 to the fifth light source 68d). That is, the relative output value is obtained by subtracting an output value A observed when the light emitting unit 66 does not emit light from an output value R observed when the light emitting unit 66 emits light. The absolute output values A and R and the relative output value R−A are acquired and calculated while the light emitting unit 66 repeats on and off. For example, as indicated by an arrow in FIG. 11, an output value R5 of the fifth predetermined wavelength $\lambda 5$ is acquired at a predetermined timing while irradiation light having the fifth predetermined wavelength $\lambda 5$ is emitted, and an absolute output value A5 of the fifth predetermined wavelength $\lambda 5$ is acquired at a timing when irradiation light is not emitted, which is a predetermined time before the predetermined timing. The same applies to the first predetermined wavelength $\lambda 1$ to the fourth predetermined wavelength $\lambda 4$. The absolute output value and the relative output value used here can be determined by using a moving average of each of a plurality of absolute output values and a plurality of relative output values obtained within a predetermined section for light sources having the same wavelength.

In the present embodiment, an AD converter having a resolution of 12 bits is used as a converter. Note that the resolution of the AD converter does not need to be 12 bits, and an AD converter having an appropriate resolution can be used. In addition, conversion can be made to an output value of an AD converter having another resolution on the basis of a value of the AD converter having a resolution of 12 bits.

Next, the control unit 50 calculates a determination value (step S32). The determination value is a numerical value used in determination in steps S33 and S34, and is a value obtained by dividing a relative output value after insertion of the component measurement chip 2 by a relative output value before insertion of the component measurement chip 2. That is, the determination value is a value obtained by dividing a relative output value acquired in step S31 by a relative output value (blank value) acquired before insertion of the component measurement chip 2. The relative output value before insertion of the component measurement chip 2 may be automatically adjusted, for example, in a process of manufacturing the component measurement device 1. The relative output value before insertion of the component measurement chip 2 is a value close to a relative output value after the adjustment in a normal case in which there is no dirt (foreign matter adhesion) or the like in the optical path. For example, in a case in which a target value in the adjustment of the relative output value is set to 2000 and a relative output value acquired in step S36 is also similarly 2000, a determination value V is calculated by $V=Vr/2000$ in step S32, in which Vr represents a relative output value acquired in step S58.

The control unit 50 determines whether or not the determination value V calculated in step S32 is within a first designated range (step S33). The first designated range is a range in which it is recognized that the component measurement chip 2 is appropriately inserted into the component measurement device 1. That is, when the determination value V is within the first designated range, the control unit 50 can recognize that the component measurement chip 2 is attached to the component measurement device 1 and a measurement spot is formed in the optical path. The first designated range can be appropriately determined according to specifications and the like of the component measurement device 1 and the appropriate component measurement chip 2. In the present embodiment, the first designated range is more than 0.05 and 0.3 or less. That is, the first designated range corresponds to a case in which a relative output value (light reception amount) after the component measurement chip 2 is inserted into the component measurement device 1 is more than 5% and 30% or less with respect to a relative output value (light reception amount) before the component measurement chip 2 is inserted into the component measurement device 1. The first designated range reflects an intensity of light that passes through the measurement reagent 22 in the component measurement chip 2 before a sample is introduced into the component measurement chip 2.

If the control unit 50 determines that the determination value V is within the first designated range, that is, if the control unit 50 determines that $0.05<V\leq0.3$ is satisfied (Yes in step S33), the control unit 50 determines that the component measurement chip 2 is appropriately inserted into the component measurement device 1. Hereinafter, this determination result will also be simply referred to as "chip normal recognition". In this case, the control unit 50 determines, in step S14 of FIG. 10, which the received light intensity is within a normal range (Yes in step S14). Then, the process proceeds to step S15 in the flow of FIG. 10.

If the control unit 50 determines that the determination value V is not within the first designated range, that is, if the control unit 50 determines that $V\leq0.05$ or $0.3<V$ is satisfied (No in step S33), the control unit 50 determines whether or not the determination value V is within a second designated range (step S34). The second designated range is a range in which the component measurement chip 2 is recognized to be inserted into the component measurement device 1 in an inappropriate mode. The second designated range can be appropriately determined according to specifications and the like of the component measurement device 1 and the appropriate component measurement chip 2. In the present embodiment, the second designated range is more than 0.01 and 0.05 or less. That is, the second designated range corresponds to a case in which a relative output value (light reception amount) after the component measurement chip 2 is inserted into the component measurement device 1 is more than 1% and 5% or less with respect to a relative output value (light reception amount) before the component measurement chip 2 is inserted into the component measurement device 1.

If the control unit 50 determines that the determination value V is within the second designated range, that is, if the control unit 50 determines that $0.01<V\leq0.05$ is satisfied (Yes in step S34), the control unit 50 determines that the component measurement chip 2 is inserted into the component measurement device 1 in an inappropriate mode. In this case, when the determination value V is within the second designated range, the control unit 50 can recognize that at least a part of the optical path is blocked by the component measurement chip 2, that the measurement spot is not correctly located in the optical path, or that the used component measurement chip 2 is erroneously attached. Hereinafter, this determination result will also be simply referred to as "chip recognition failure". In this case, the control unit 50 determines, in step S14 of FIG. 10, which the received light intensity is not within a normal range (No in step S14). In this case, the control unit 50 notifies that an error has occurred, for example, by outputting a buzzer sound from the buzzer unit 59 (step S18). For example, the control unit 50 may output a buzzer sound or may notify that abnormality has occurred by voice. The control unit 50 may notify that abnormality has occurred by displaying the occurrence of the abnormality on the display unit 11. Note that in a case in which an error has occurred, the control unit 50 may stop processing. For example, after giving notification of an error, the control unit 50 stops processing of measuring the measurement target component. Therefore, in a case in which there is a possibility that abnormality has occurred, processing is not executed. In this manner, by giving notification of an error in a case in which there is a possibility that the component measurement chip 2 is inserted in an inappropriate mode, the control unit 50 can detect whether or not normal measurement can be executed.

If the control unit 50 determines that the determination value V is not within the second designated range (No in step S34), the process proceeds to step S33. By the process proceeding from step S34 to step S33, the control unit 50 may be caused to recognize that the component measurement chip 2 is insufficiently inserted into the chip insertion space S. In this manner, the control unit 50 repeats steps S33 and S34 until the control unit 50 determines that the determination value V is within the first designated range or determines that the determination value V is within the second designated range.

Note that, in the present embodiment, in a case in which the determination value V is neither within the first designated range nor within the second designated range, that is, in a case in which $V\leq0.01$ or $0.3<V$ is satisfied, the control unit 50 does not need to make a determination regarding chip normal recognition or chip recognition failure. This is because there is a possibility that the component measurement chip 2 is not inserted into the component measurement device 1 in this case, and this state is not an appropriate state in order to make a determination regarding chip normal recognition or chip recognition failure. For example, in a case in which a part other than a measurement target site of the component measurement chip 2 is formed of a light shielding member, irradiation light coming from the light emitting unit 66 is blocked by the component measurement chip 2 while the component measurement chip 2 is being inserted into the component measurement device 1. In this case, the irradiation light is blocked and is not received by the light receiving unit 72. Therefore, there is a possibility that a relative output value is a value close to 0 and the determination value V is 0.01 or less. However, in this case, the component measurement chip 2 is in the middle of being inserted, and this state is not an appropriate state in order to make a determination regarding chip normal recognition or chip recognition failure. Therefore, in this case, the determination is not made, and the determination is made in a case in which the determination value V is within the first designated range or the second designated range.

In this manner, the control unit 50 according to the present embodiment determines whether or not the component measurement chip 2 has been attached to (inserted into) the component measurement device 1. In a case in which the control unit 50 makes a determination of chip recognition failure, the control unit 50 may notify an operator of the chip recognition failure to urge the operator to attach the component measurement chip 2 correctly.

In the second received light intensity determining processing, each of the first designated range and the second designated range may be determined for each of the first light source 67 to the fifth light source 68d, or may be the same for all of the first light source 67 to the fifth light source 68d. For example, absorption and reflection properties in the measurement reagent 22 may vary depending on the wavelengths λ1 to λ5 of irradiation light emitted from the first light source 67 to the fifth light source 68d. Therefore, for example, by varying the first designated range and the second designated range depending on an absorptivity in the measurement reagent 22, the determination can be made more accurately according to properties of the irradiation light.

In addition, in the second received light intensity determining processing, the control unit 50 may determine that the condition is satisfied (that is, Yes in each branch of the flow of FIG. 13) if the output value from the AD converter is within a predetermined range (first designated range or second designated range) over a predetermined period. The predetermined period may be determined by, for example, a predetermined time. In this case, the predetermined period is set to, for example, three seconds. The predetermined period may be determined by, for example, the number of times of light emission of the first light source 67 to the fifth light source 68d. In this case, for example, the predetermined period is determined to be three pairs of the output of the 16 sets of emission processing and the output stop of irradiation light (that is, three continuous pairs). As described above, by providing the predetermined period for determination in the second received light intensity determining processing, it is easy to prevent an erroneous determination that the component measurement chip 2 has been attached to the component measurement device 1 in a case in which the output value from the AD converter is temporarily within the predetermined range due to some factor other than the insertion of the component measurement chip 2.

Note that, in a case in which the predetermined period is determined by the number of times of light emission of the first light source 67 to the fifth light source 68d, when light reception is first detected by the light receiving unit 72 after irradiation light is not received in step S13, the control unit 50 may change an interval for executing the pair of the output of the 16 sets of emission processing and the output stop of irradiation light. In particular, the control unit 50 may shorten the interval for executing the pair of the output of the 16 sets of emission processing and the output stop of irradiation light. For example, as described above, in step S11, in a case in which the pair of the output of the 16 sets of emission processing and the output stop of irradiation light is executed every one second, the control unit 50 may shorten the interval for executing this pair to 0.5 seconds. As a result, the interval for executing the pair of the output of the 16 sets of emission processing and the output stop of irradiation light can be shortened, and a result of the second received light intensity determining processing can be easily determined earlier.

With reference to FIG. 10 again, if the control unit 50 determines that the received light intensity in the light receiving unit 72 is within the predetermined range (Yes in step S14), the control unit 50 determines abnormality of the component measurement chip 2 attached to the component measurement device 1.

Here, the determination of abnormality by the control unit 50 will be described. Here, as an example of the abnormality, an example of determining deterioration of the component measurement chip 2 will be described. Specifically, the component measurement chip 2 includes the measurement reagent 22 on the base member 21. The measurement reagent 22 is applied onto the base member 21. The quality of the measurement reagent 22 is deteriorated by, for example, application of energy such as heat or ultraviolet rays. The deterioration in quality here includes a phenomenon that a coloring component is generated even in a state in which a specific dye contained in the measurement reagent 22 has not reacted with the sample and a phenomenon that the dye itself fades. As a result, a color changes in the measurement reagent 22 that has not reacted with the sample, that is, that has not been used. The control unit 50 according to the present embodiment determines deterioration from a color change of the measurement reagent 22 in such a form of the component measurement chip 2.

Figure 14:
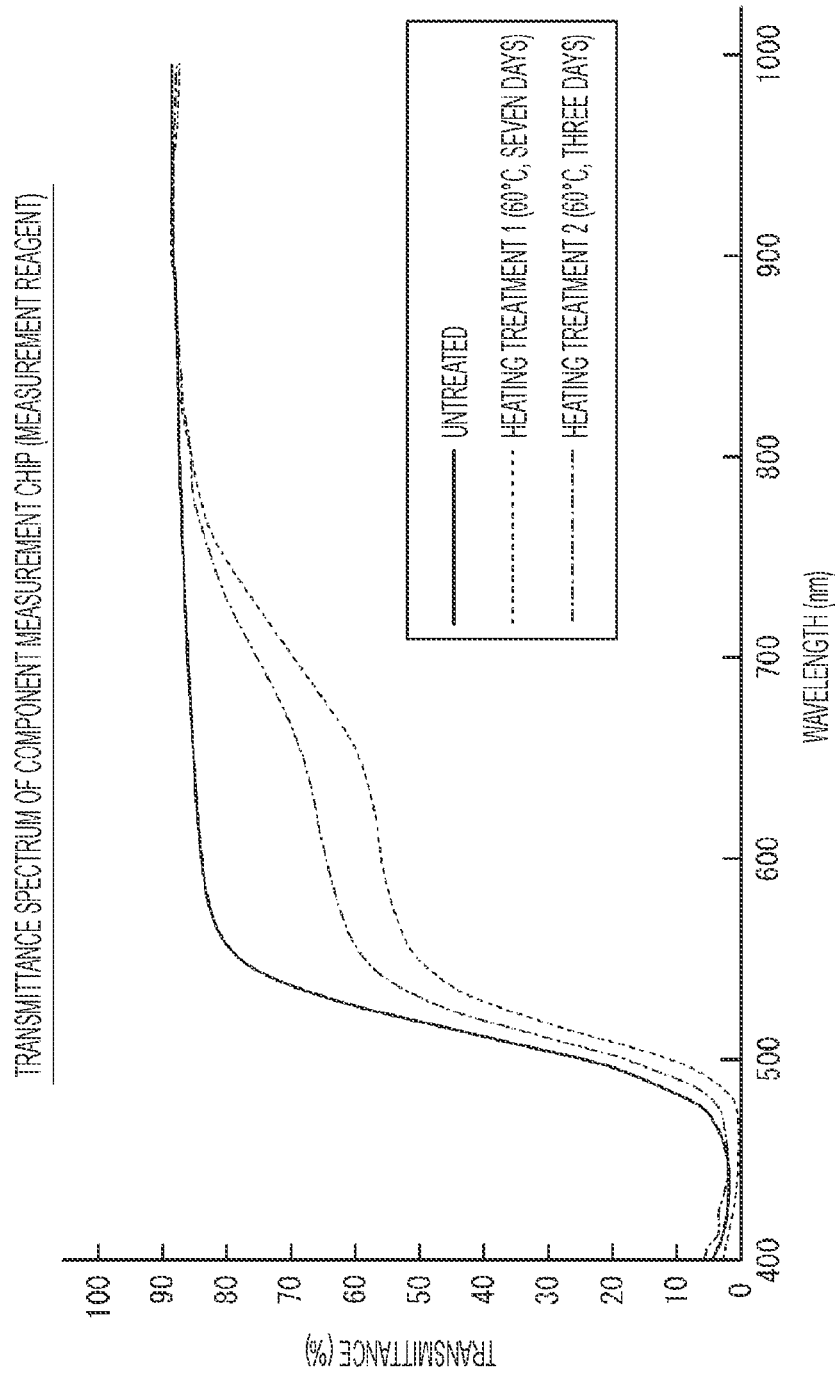
FIG. 14 is a diagram illustrating an example of a transmittance spectrum of a measurement reagent.

FIG. 14 is a diagram illustrating an example of a transmittance spectrum of the measurement reagent 22 on the unused component measurement chip 2. Specifically, FIG. 14 is a diagram illustrating results obtained by measuring transmittance spectra of the component measurement chip 2 to which the measurement reagent 22 is applied and then which is not subjected to a heating treatment (untreated, that is, non-deteriorated state), the component measurement chip 2 stored at 60° C. for three days (heating treatment 2), and the component measurement chip 2 stored at 60° C. for seven days (heating treatment 1). The transmittance spectra were measured in a form of the component measurement chip 2 using an appropriate detector. Here, since the component measurement chips 2 from which the transmittance spectra of the heating treatment 1 and the heating treatment 2 are obtained are deteriorated, component measurement therefor cannot be accurately performed. In the graph illustrated in FIG. 14, the horizontal axis represents a wavelength of irradiation light emitted so as to pass through the measurement reagent 22 on the component measurement chip 2, and the vertical axis represents a transmittance of a light beam having each wavelength.

In the present embodiment, as illustrated in FIG. 14, in the component measurement chip 2 (untreated) in a non-deteriorated state, the transmittance significantly increases at wavelengths of about 500 nm to 550 nm, and the transmittance at wavelengths of 550 nm or more exceeds 80%. Meanwhile, in the deteriorated component measurement chips 2 (heating treatment 1 and heating treatment 2), the transmittance does not reach 80% and is within a range of 50% to 70% although the transmittance similarly increases at wavelengths of 500 nm to 550 nm. In the deteriorated measurement reagent 22, the transmittance gradually increases between 550 nm and 800 nm, and irradiation light having a wavelength of about 800 nm or more exhibits the same level of transmittance as that of the normal component measurement chip 2. As described above, in the present embodiment, there is a difference in transmittance to irradiation light in a wavelength band of 550 nm to 800 nm between the normal measurement reagent 22 (component measurement chip 2) and the deteriorated measurement reagent 22. The control unit 50 determines whether or not the component measurement chip 2 is deteriorated using this difference in transmittance.

For example, in a case in which a transmittance when a certain measurement reagent 22 is irradiated with irradiation light having a predetermined wavelength deviates from a transmittance when the normal measurement reagent 22 is irradiated with irradiation light having the predetermined wavelength by a predetermined value or more, it can be determined that a color change has occurred in the certain measurement reagent 22 due to deterioration. As described above, it is possible to determine whether or not the measurement reagent 22 is deteriorated from a difference between the transmittance in the normal measurement reagent 22 and the transmittance in a measurement reagent 22 to be used in the component measuring processing. In the present embodiment, the higher the transmittance, the higher the received light intensity in the light receiving unit 72, and therefore, the component measurement device 1 determines whether or not the measurement reagent 22 is deteriorated using the received light intensity in the light receiving unit 72.

Specifically, the control unit 50 detects abnormality (deterioration in this case) of the component measurement chip 2 on the basis of a ratio, to a received light intensity in the light receiving unit 72 when irradiation light having a specific wavelength is emitted from the light emitting unit 66, of a received light intensity in the light receiving unit 72 when irradiation light having another wavelength is emitted from the light emitting unit 66.

In the present embodiment, the control unit 50 uses the first light source 67, the second light source 68a, the third light source 68b, the fourth light source 68c, and the fifth light source 68d as light emission sources of irradiation light. Specifically, in the present embodiment, the specific wavelength is λ3 (940 nm) included in an infrared region, and the other wavelengths are λ1 (660 nm), λ2 (850 nm), λ4 (520 nm), and λ5 (589 nm). As described above, the irradiation light having another wavelength may include irradiation light having a plurality of wavelengths. In addition, these specific wavelengths are not limited to the numerical values described here, and only need to be within the wavelength range defined in the present embodiment. Note that the control unit 50 may perform scanning with continuous light including λ1, λ2, λ3, λ4, and λ5, and the light receiving unit 72 may receive light having these wavelengths. Note that, in consideration of downsizing of the component measurement device 1, it is preferable to use a light emitting unit having light sources corresponding to the wavelengths, respectively, instead of continuous light.

That is, the control unit 50 detects abnormality of the component measurement chip 2 (measurement reagent 22) on the basis of a ratio of a received light intensity in the light receiving unit 72 when irradiation light beams having the wavelengths λ1, λ2, λ4, and λ5 are emitted from the first light source 67, the second light source 68a, the fourth light source 68c, and the fifth light source 68d, respectively, to a ratio of a received light intensity in the light receiving unit 72 when irradiation light having the wavelength λ3 is emitted from the third light source 68b.

At this time, the control unit 50 determines that abnormality has occurred in the component measurement chip 2 in a case in which the ratio is out of a predetermined range. In a case in which the irradiation light having another wavelength includes irradiation light having a plurality of wavelengths as in the present embodiment, the predetermined range here is individually set for each of the plurality of wavelengths.

For example, the ratio of a received light intensity in the light receiving unit 72 when irradiation light having the wavelength λ1 is emitted from the first light source 67 to a received light intensity in the light receiving unit 72 when irradiation light having the wavelength λ3 is emitted from the third light source 68b is represented by $T_{13}$. Similarly, the ratio of a received light intensity in the light receiving unit 72 when irradiation light having the wavelength 22 is emitted from the second light source 68a to a received light intensity in the light receiving unit 72 when irradiation light having the wavelength λ3 is emitted from the third light source 68b is represented by $T_{23}$. The ratio of a received light intensity in the light receiving unit 72 when irradiation light having the wavelength λ4 is emitted from the fourth light source 68c to a received light intensity in the light receiving unit 72 when irradiation light having the wavelength λ3 is emitted from the third light source 68b is represented by $T_{43}$. The ratio of a received light intensity in the light receiving unit 72 when irradiation light having the wavelength λ5 is emitted from the fifth light source 68d to a received light intensity in the light receiving unit 72 when irradiation light having the wavelength 23 is emitted from the third light source 68b is represented by $T_{53}$.

The control unit 50 determines whether or not the ratio T13 is within a first range R1. Similarly, the control unit 50 determines whether or not the ratio $T_{23}$ is within a second range R2, whether or not the ratio $T_{43}$ is within a third range R3, and whether or not the ratio $T_{53}$ is within a fourth range R4. The first range R1, the second range R2, the third range R3, and the fourth range R4 are predetermined ranges set corresponding to the ratio $T_{13}$, the ratio $T_{23}$, the ratio $T_{43}$, and the ratio $T_{53}$, respectively. The first range R1, the second range R2, the third range R3, and the fourth range R4 are individually set as described above.

For example, in the present embodiment, the first range R1 is more than 0.8 and less than 1.2. In the present embodiment, the second range R2 is more than 0.8 and less than 1.2. In the present embodiment, the third range R3 is more than 0.4 and less than 0.8. In the present embodiment, the fourth range R4 is more than 0.8 and less than 1.2.

The predetermined range (the first range R1 to the fourth range R4 in the present embodiment) may be determined in advance from data obtained by, for example, an experiment and stored in the storage unit 52. Therefore, the numerical values described here are merely examples, and are actually determined appropriately.

Note that, in this example, a numerical value of "1.2" exceeding "1.0" is set as an upper threshold of each of the first range R1, the second range R2, and the fourth range R4.

In a case in which the normal measurement reagent 22 exhibits such a transmittance spectrum as illustrated in FIG. 14, the first range R1, the second range R2, and the fourth range R4 usually do not exceed 1.0. However, assuming that there is a possibility that the first range R1, the second range R2, and the fourth range R4 exceed 1.0 due to a measurement error or the like, a value of "1.2" is set here in order to prevent uniform determination that deterioration has occurred when the ratio $T_{13}$, the ratio $T_{23}$, and the ratio $T_{53}$ exceed 1.0.

The control unit 50 determines whether or not the ratio $T_{13}$, the ratio $T_{23}$, the ratio $T_{43}$, and the ratio $T_{53}$ are within the first range R1, the second range R2, the third range R3, and the fourth range R4, respectively. The control unit 50 determines that abnormality has occurred in the component measurement chip 2 in a case in which the ratio is out of the predetermined range for at least one of the plurality of wavelengths. That is, in this example, in a case in which the ratio $T_{13}$ is not within the first range R1, the ratio $T_{23}$ is not within the second range R2, the ratio $T_{43}$ is not within the third range R3, or the ratio $T_{53}$ is not within the fourth range R4, the control unit 50 determines that abnormality has occurred in the component measurement chip 2. Meanwhile, in a case in which the ratio $T1_3$, the ratio $T_{23}$, the ratio $T_{43}$, and the ratio $T_{53}$ are within the first range R1, the second range R2, the third range R3, and the fourth range R4, respectively, the control unit 50 determines that no abnormality has occurred in the component measurement chip 2. Note that, in the above example, the ratio $T_{13}$, the ratio $T_{23}$, the ratio $T_{43}$, and the ratio $T_{53}$ are determined as the ratios of the received light intensities of other wavelengths ($\lambda 1, \lambda 2, \lambda 4$, and $\lambda 5$) to the received light intensity of the wavelength $\lambda 3$, but the control unit 50 may calculate the ratios using the determination value used for the determination of the second received light intensity.

With reference to FIG. 10 again, processing of determining abnormality of the component measurement chip 2, which is executed by the control unit 50, will be described. The control unit 50 performs processing of determining abnormality of the component measurement chip 2 in steps S15 and S16 of the flow in FIG. 10.

Specifically, if the control unit 50 determines that the received light intensity in the light receiving unit 72 is within the predetermined range (Yes in step S14), the process proceeds to step S15. In step S15, the control unit 50 calculates a ratio, to a received light intensity in the light receiving unit 72 when irradiation light having a specific wavelength is emitted from the light emitting unit 66, of a received light intensity in the light receiving unit 72 when irradiation light having another wavelength is emitted from the light emitting unit 66. That is, in the present embodiment, in step S15, the control unit 50 calculates the ratio $T_{13}$, the ratio $T_{23}$, the ratio $T_{43}$, and the ratio $T_{53}$.

Figure 15:
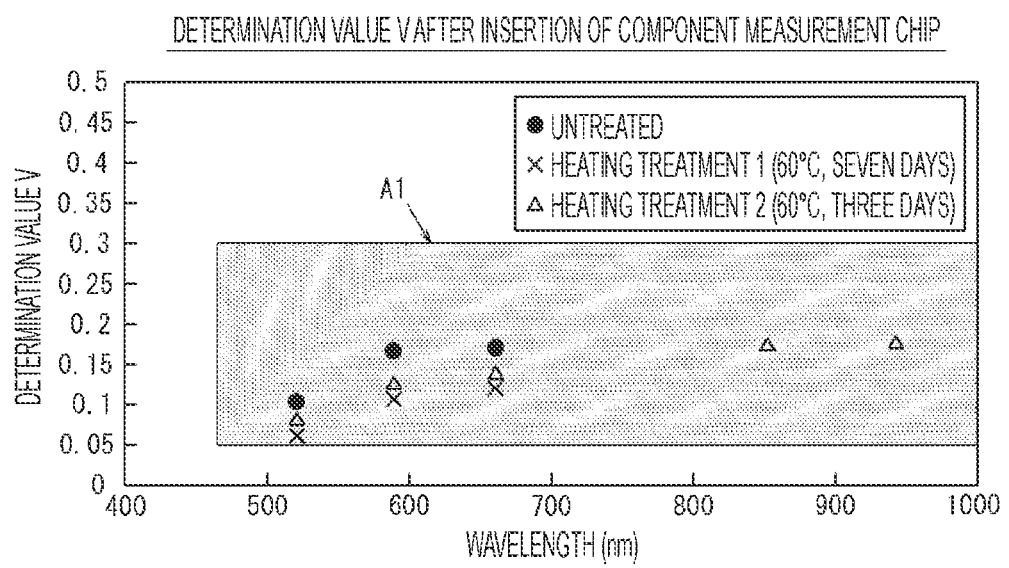
FIG. 15 is a diagram illustrating an example of a determination value in a state in which a component measurement chip is inserted into a chip insertion space of a component measurement device.

FIG. 15 is a diagram illustrating an example of the determination value V in a state in which the component measurement chip 2 is inserted into the chip insertion space S of the component measurement device 1. Specifically, FIG. 15 is a diagram illustrating the determination value V in a state in which the component measurement chip 2 including each of the measurement reagent 22 in a non-deteriorated state (normal test paper) and two types of measurement reagents 22 having different storage conditions, one of which being stored at 60° C. for three days (heating treatment 1) and the other of which being stored at 60° C. for seven days (heating treatment 2), which are the same as those illustrated in FIG. 14, is inserted into the component measurement device 1. In the graph illustrated in FIG. 15, the horizontal axis represents a wavelength of irradiation light with which the measurement reagent 22 is irradiated, and the vertical axis represents a value of the determination value V. In FIG. 15, a shaded region A1 indicates the first designated range (more than 0.05 and 0.3 or less) of the determination value V.

In the example illustrated in FIG. 15, the determination values V of both the measurement reagent 22 in a non-deteriorated state and the deteriorated measurement reagents 22 are within the shaded region A1, that is, within the first designated range although they vary depending on a wavelength. Therefore, even if the component measurement chip 2 including any one of the normal measurement reagent 22 and the two type of deteriorated measurement reagents 22 is inserted into the component measurement device 1, it is determined, in step S14 in the flow of FIG. 10, that the received light intensity in the light receiving unit 72 is within the predetermined range (Yes in step S14).

Figure 16:
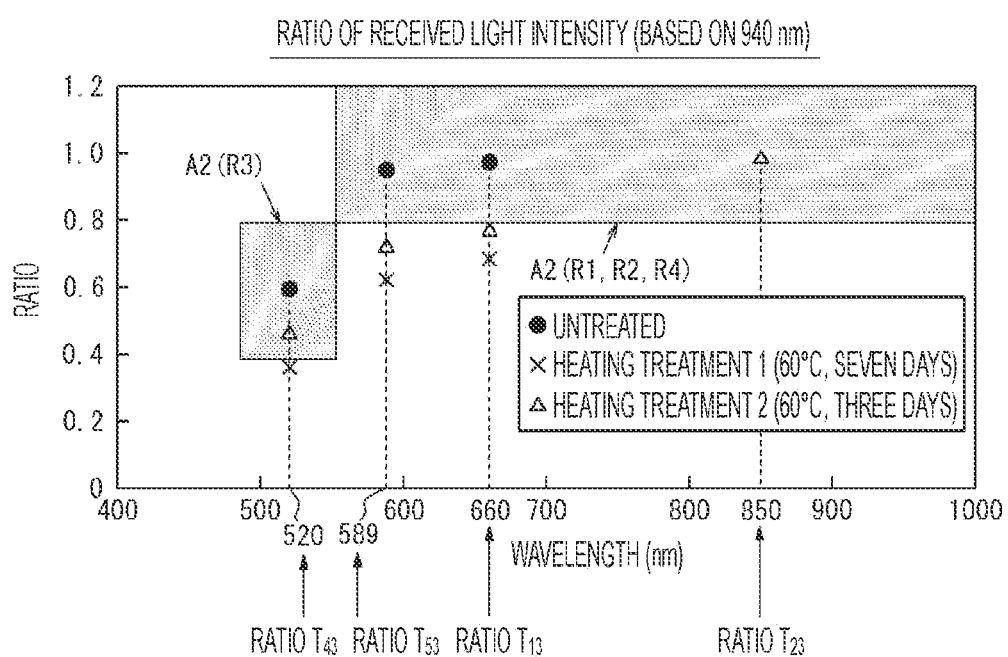
FIG. 16 is a diagram illustrating a distribution of ratios of received light intensities calculated by a control unit in FIG. 6.

FIG. 16 is a diagram illustrating a distribution of ratios of received light intensities calculated by the control unit 50. That is, FIG. 16 illustrates a distribution of ratios, to a received light intensity in the light receiving unit 72 when irradiation light having a specific wavelength is emitted from the light emitting unit 66, of a received light intensity in the light receiving unit 72 when irradiation light having another wavelength is emitted from the light emitting unit 66. Specifically, FIG. 16 is a diagram illustrating a ratio of a received light intensity in a state in which the component measurement chip 2 including each of the normal measurement reagent 22 that is not deteriorated and the two types of deteriorated measurement reagents 22, which are the same as those illustrated in FIG. 14, is inserted into the component measurement device 1. In the graph illustrated in FIG. 16, the horizontal axis represents a wavelength of irradiation light with which the measurement reagent 22 is irradiated, and the vertical axis represents a value of a ratio of a received light intensity. In FIG. 16, a shaded region A2 indicates a predetermined range used to detect abnormality of the component measurement chip 2.

In step S15 of the flow illustrated in FIG. 10, the control unit 50 calculates the ratio $T1_3$, the ratio $T_{23}$, the ratio $T_{43}$, and the ratio $T_{53}$. FIG. 16 illustrates plots of the ratio $T_{13}$, the ratio $T_{23}$, the ratio $T_{43}$, and the ratio $T_{53}$ calculated in this manner. In FIG. 16, all the ratios in a case in which the normal measurement reagent 22 that is not deteriorated and the two types of deteriorated measurement reagents 22 are used are illustrated as plots. However, in a case in which the control unit 50 actually executes the flow of FIG. 10, only one of the measurement reagents 22 is included in the component measurement chip 2. Therefore, for example, it should be noted that only the ratio indicated by the plot of any one of the measurement reagents 22 among the plots illustrated in FIG. 16 is calculated.

The control unit 50 determines whether or not the ratio of a received light intensity calculated in step S15 is within a predetermined range (step S16). As in the present embodiment, in a case in which the irradiation light having another wavelength includes irradiation light having a plurality of wavelengths, the control unit 50 determines whether or not the ratio of a received light intensity is within the predetermined range for each of the plurality of other wavelengths. That is, in the example described here, the control unit 50 determines whether or not the ratio $T_{13}$ is within the first range R1, whether or not the ratio $T_{23}$ is within the second range R2, whether or not the ratio $T_{43}$ is within the third range R3, and whether or not the ratio $T_{53}$ is within the fourth range R4.

As described above, in the present embodiment, the first range R1 is set to a value more than 0.8 and less than 1.2, the second range R2 is set to a value more than 0.8 and less than 1.2, the third range R3 is set to a value more than 0.4 and less than 0.8, and the fourth range R4 is set to a value more than 0.8 and less than 1.2. This range is indicated as the shaded region A2 in FIG. 16. Note that, although the shaded region A2 illustrated in FIG. 16 is displayed so as to spread over the width of a predetermined wavelength region, this display is merely for convenience of description. Actually, a predetermined range only needs to be set at a wavelength of irradiation light emitted from the light emitting unit 66.

As illustrated in FIG. 16, in the normal measurement reagent 22, all of the ratio $T_{13}$, the ratio $T_{23}$, the ratio $T_{43}$, and the ratio $T_{53}$ of the received light intensity calculated in step S15 are within the first range R1, the second range R2, the third range R3, and the fourth range R4, respectively. As described above, if the ratio of the received light intensity is within the predetermined range for all the wavelengths, the control unit 50 determines that the ratio of the received light intensity is within the predetermined range (Yes in step S16). That is, in this case, it is determined that no abnormality has occurred in the measurement reagent 22 (component measurement chip 2).

If the control unit 50 determines that the ratio of the received light intensity is within the predetermined range (Yes in step S16), the control unit 50 executes, for example, the component measuring processing as described with reference to FIG. 9 (step S17).

Meanwhile, as illustrated in FIG. 16, in the deteriorated first measurement reagent 22, among the ratio $T1_3$, the ratio $T_{23}$, the ratio $T_{43}$, and the ratio $T_{53}$ of the received light intensity calculated in step S15, the ratio $T_{23}$ is within the second range R2. However, the ratio $T_{13}$, the ratio $T_{43}$, and the ratio $T_{53}$ are all below the first range R1, the third range R3, and the fourth range R4, respectively, that is, are not within the first range R1, the third range R3, and the fourth range R4, respectively.

Similarly, as illustrated in FIG. 16, in the deteriorated second measurement reagent 22, among the ratio $T_{13}$, the ratio $T_{23}$, the ratio $T_{43}$, and the ratio $T_{53}$ of the received light intensity calculated in step S15, the ratio $T_{23}$ and the ratio $T_{43}$ are within the second range R2 and the third range R3, respectively. However, both the ratio $T_{13}$ and the ratio $T_{53}$ are below the first range R1 and the fourth range R4, respectively, that is, are not within the first range R1 and the fourth range R4, respectively.

As described above, if the ratio of the received light intensity is outside the predetermined range for at least one wavelength, the control unit 50 determines that the ratio of the received light intensity is outside the predetermined range (No in step S16). In this case, the measurement reagent 22 (component measurement chip 2) is discolored, and it is determined that abnormality (deterioration) has occurred in the measurement reagent 22.

If the control unit 50 determines that the ratio of the received light intensity is not within the predetermined range (No in step S16), the control unit 50 determines that abnormality has occurred in the component measurement chip 2 inserted into the component measurement device 1. In this case, the control unit 50 notifies that an error has occurred, for example, by outputting a buzzer sound from the buzzer unit 59 (step S18). The mode of the error notification may be similar to that in the above-described example.

Note that the mode of the error notification may be appropriately changed according to the content of an error for notification. For example, a mode of error notification given if it is determined that the received light intensity in the light receiving unit 72 is not within the normal range (No in step S12), a mode of error notification given if a determination of chip recognition failure is made (No in step S14), and a mode of error notification given if it is determined that the ratio of the received light intensity is not within the predetermined range (No in step S16) may be different from each other. Specifically, buzzer sounds to be output may be different from each other. The modes of error notification are different from each other, and therefore a user who has heard error notification can recognize the content of the error.

If the control unit 50 notifies that an error has occurred in step S18, the control unit 50 may end this flow without executing the component measuring processing. In this manner, the component measuring processing can be executed only in a case in which no error has occurred.

As described above, the component measurement device 1 according to the present embodiment detects abnormality of the component measurement chip 2 on the basis of a ratio, to a received light intensity in the light receiving unit 72 when irradiation light having a specific wavelength is emitted from the light emitting unit 66, of a received light intensity in the light receiving unit 72 when irradiation light having another wavelength is emitted from the light emitting unit 66. That is, the component measurement device 1 can detect a change in color of the measurement reagent 22 of the component measurement chip 2 from the ratio of the received light intensity and determine deterioration. Since it is not necessary to dispose a special member in the component measurement chip 2 for this determination, the component measurement device 1 can detect abnormality of the component measurement chip 2 without separately disposing a special member. In addition, since the irradiation light emitted from the light emitting unit 66 is irradiation light used also in the component measuring processing by the component measurement device 1, it is not necessary to separately dispose a special member also in the component measurement device 1.

In the present embodiment, the specific wavelength is the wavelength λ3 included in an infrared region. The wavelength in the infrared region is not a wavelength in a visible light region. Therefore, in a case in which the specific wavelength is a wavelength included in the infrared region as in the present embodiment, the received light intensity of the specific wavelength is hardly changed even if the color change occurs in the measurement reagent 22. Therefore, by setting the specific wavelength to a wavelength included in the infrared region, accuracy of the abnormality determining processing by the component measurement device 1 can be improved. As described above, the specific wavelength is preferably a wavelength included in the infrared region. Note that this is not intended to exclude that the specific wavelength is a wavelength outside the infrared region. Even if the specific wavelength is a wavelength outside the infrared region, the abnormality determining processing described in the present embodiment can be executed.

In addition, in the present embodiment, the irradiation light having another wavelength includes irradiation light having a plurality of wavelengths (λ1, λ2, λ4, and λ5), and the predetermined range (R1, R2, R3 and R4) is individually set for each of the plurality of wavelengths. The control unit 50 determines that abnormality has occurred in the component measurement chip 2 in a case in which the ratio of the received light intensity is out of the predetermined range for at least one of the plurality of wavelengths. As described above, by using irradiation light having a plurality of wavelengths in order to determine abnormality of the component measurement chip 2, abnormality can be easily detected with higher accuracy. Note that, as long as the irradiation light having another wavelength includes irradiation light having at least one wavelength, the abnormality determining processing described in the present embodiment can be executed. For example, in a case in which deterioration is determined as in the above embodiment, for example, irradiation light having $\lambda 1$ (660 nm) or $\lambda 5$ (589 nm) may be used as the irradiation light having another wavelength. In this case, it is possible to determine deterioration of the component measurement chip 2 by determining whether or not the ratio $T_{13}$ is within the predetermined range R1 or whether or not $T_{53}$ is within the predetermined range R4.

In the above embodiment, an example in which the component measurement device 1 determines deterioration as an example of abnormality has been described, but the component measurement device 1 may detect abnormality other than deterioration on the basis of a similar principle. The component measurement device 1 can detect abnormality accompanied by a color change occurring in the component measurement chip 2. For example, the component measurement device 1 can detect dirt or blood adhesion generated on the component measurement chip 2. For example, the component measurement device 1 may determine the type of abnormality on the basis of a distribution of ratios of received light intensities in the light receiving unit 72 to irradiation light having a plurality of wavelengths. In this case, the component measurement device 1 may give notification of the content of the determined type of abnormality.

The component measurement device, the component measurement device set, and the information processing method according to the present invention are not limited to the specific description of the above-described embodiment, and various modifications can be made without departing from the gist of the invention described in the claims. In the above-described embodiment, the glucose concentration is measured as the measurement of glucose as the measurement target component, but the measurement target is not limited to the concentration, and another physical quantity may be measured. In addition, in the above-described embodiment, glucose in a plasma component is exemplified as the measurement target component in blood, but the measurement target component is not limited thereto. For example, cholesterol, saccharides, ketone bodies, uric acid, hormones, nucleic acids, antibodies, antigens, and the like in blood can also be used as the measurement target components. Therefore, the component measurement device is not limited to a blood glucose level measurement device. Furthermore, in the above-described embodiment, the light receiving unit 72 receives transmission light that has passed through the component measurement chip 2, but may receive reflected light reflected from the component measurement chip 2.

INDUSTRIAL APPLICABILITY

The present disclosure relates to a component measurement device, a component measurement device set, and an information processing method.

REFERENCE CHARACTER LIST

1 Component measurement device
2 Component measurement chip
10 Housing
10a Main body portion
10b Chip attachment portion
10s Distal end opening
11 Display unit
12 Detachment lever
13 Power button
14 Operation button
21 Base member
22 Measurement reagent
23 Flow path
23a Gap
24 Supply portion
25 Cover member
26 Eject pin
50 Control unit
51 Photometric unit
52 Storage unit
53 Temperature measurement unit
54 Power supply unit
55 Battery
56 Communication unit
57 Clock unit
58 Operation unit
59 Buzzer unit
66 Light emitting unit
67 First light source
68a Second light source
68b Third light source
68c Fourth light source
68d Fifth light source
69a First throttle portion
69b Second throttle portion
72 Light receiving unit
80 Holder member
100 Component measurement device set

The invention claimed is:

1. A component measurement device comprising:
a chip insertion space into which a component measurement chip is insertable;
a light emitting unit configured to emit irradiation light to the component measurement chip in a state in which the component measurement chip is located in the chip insertion space;
a light receiving unit configured to receive light that has passed through or has been reflected by the component measurement chip; and
a control unit configured to detect abnormality of the component measurement chip on a basis of a ratio of (i) a received light intensity in the light receiving unit when irradiation light having a first wavelength is emitted from the light emitting unit to (ii) a received light intensity in the light receiving unit when irradiation light having a second wavelength is emitted from the light emitting unit.

2. The component measurement device according to claim 1, wherein the control unit is configured to determine that the abnormality has occurred in the component measurement chip when the ratio is out of a predetermined range.

3. The component measurement device according to claim 2, wherein:
the irradiation light having the first wavelength includes irradiation light having a plurality of wavelengths,
the predetermined range is individually set for each of the plurality of wavelengths, and
the control unit is configured to determine that the abnormality has occurred in the component measurement chip when the ratio is out of the predetermined range for at least one of the plurality of wavelengths.

4. The component measurement device according to claim 1, wherein the second wavelength is a wavelength included in an infrared region.

5. A component measurement device set comprising: a component measurement chip; and a component measurement device comprising: a chip insertion space into which the component measurement chip is insertable; a light emitting unit configured to emit irradiation light to the component measurement chip in a state in which the component measurement chip is located in the chip insertion space; a light receiving unit configured to receive light that has passed through or has been reflected by the component measurement chip; and a control unit configured to detect abnormality of the component measurement chip on a basis of a ratio of (i) a received light intensity in the light receiving unit when irradiation light having a first wavelength is emitted from the light emitting unit to (ii) a received light intensity in the light receiving unit when irradiation light having a second wavelength is emitted from the light emitting unit.

6. An information processing method executed by a component measurement device comprising: a chip insertion space into which a component measurement chip is insertable, a light emitting unit configured to emit irradiation light to the component measurement chip in a state in which the component measurement chip is located in the chip insertion space, a light receiving unit configured to receive light that has passed through or has been reflected by the component measurement chip, and a control unit, the information processing method comprising, with the control unit: a step of calculating a ratio of (i) a received light intensity in the light receiving unit when irradiation light having a first wavelength is emitted from the light emitting unit to (ii) a received light intensity in the light receiving unit when irradiation light having a second wavelength is emitted from the light emitting unit; and a step of detecting abnormality of the component measurement chip on a basis of the calculated ratio.

* * * * *